(12) United States Patent
Okada et al.

(10) Patent No.: US 10,890,836 B1
(45) Date of Patent: Jan. 12, 2021

(54) PROJECTOR

(71) Applicant: SEIKO EPSON CORPORATION, Tokyo (JP)

(72) Inventors: Naoya Okada, Shiojiri (JP); Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/925,526

(22) Filed: Jul. 10, 2020

(30) Foreign Application Priority Data

Jul. 12, 2019 (JP) .................................. 2019-130443

(51) Int. Cl.
*G03B 21/16* (2006.01)
*H04N 9/31* (2006.01)

(52) U.S. Cl.
CPC .......... *G03B 21/16* (2013.01); *H04N 9/3144* (2013.01)

(58) Field of Classification Search
CPC .............................. G03B 21/16; H04N 9/3144
USPC ........................................................... 353/54
See application file for complete search history.

(56) References Cited

U.S. PATENT DOCUMENTS

| | | | | |
|---|---|---|---|---|
| 2002/0191159 | A1* | 12/2002 | Nagao ................ | H04N 9/3144 353/54 |
| 2009/0086169 | A1 | 4/2009 | Nakamura | |
| 2010/0132379 | A1 | 6/2010 | Wu et al. | |
| 2011/0242499 | A1 | 10/2011 | Terao | |
| 2019/0196311 | A1 | 6/2019 | Sugiyama et al. | |

FOREIGN PATENT DOCUMENTS

| | | |
|---|---|---|
| JP | H11-057383 A | 3/1999 |
| JP | H11-169644 A | 6/1999 |
| JP | 2002-107698 A | 4/2002 |
| JP | 2002-372748 A | 12/2002 |
| JP | 2007-294655 A | 11/2007 |
| JP | 2009-086271 A | 4/2009 |
| JP | 2010-107751 A | 5/2010 |
| JP | 2011-036768 A | 2/2011 |
| JP | 2011-215457 A | 10/2011 |
| JP | 2014-087797 A | 5/2014 |
| JP | 2019-117332 A | 7/2019 |

\* cited by examiner

*Primary Examiner* — Ryan D Howard
(74) *Attorney, Agent, or Firm* — Oliff PLC

(57) ABSTRACT

A projector having a cooling target includes a light source configured to emit light, a light modulator configured to modulate the light emitted from the light source, a projection optical device configured to project the light modulated by the light modulator, a cooler configured to cool the cooling target based on transformation of a refrigerant into a gas, and a controller configured to control the cooler. The cooler includes a refrigerant generator configured to generate the refrigerant, and a refrigerant sender configured to transmit the generated refrigerant toward the cooling target. The controller controls the refrigerant generator based on at least one of temperature of the cooling target and ambient humidity of the projector.

13 Claims, 10 Drawing Sheets

PROJECTOR

The present application is based on, and claims priority from JP Application Serial Number 2019-130443, filed Jul. 12, 2019, the disclosure of which is hereby incorporated by reference herein in its entirety.

BACKGROUND

1. Technical Field

The present disclosure relates to a projector.

2. Related Art

As a device for cooling a projector, there are proposed such a cooler due to air cooling using a blower as described in, for example, JP-A-2002-107698, such a cooler due to liquid cooling using a pump for feeding a refrigerant liquid and a pipe for transmitting the refrigerant liquid as described in, for example, JP-A-2007-294655, and so on.

In recent years, due to an increase in luminance of projectors, an amount of heat of a cooling target to be cooled by a cooler has increased, and an improvement in cooling performance of the cooler is required. However, when improving the cooling performance in the cooler described above using air cooling, liquid cooling, and so on, there is a problem that the cooler grows in size, and thus the projector grows in size. Further, in the case of air cooling, there is also a problem that the sound noise due to the blower increases.

SUMMARY

A projector according to an aspect of the present disclosure is a projector having a cooling target, including a light source configured to emit light, a light modulator configured to modulate the light emitted from the light source in accordance with an image signal, a projection optical device configured to project the light modulated by the light modulator, a cooler configured to cool the cooling target based on transformation of a refrigerant into a gas, and a controller configured to control the cooler. The cooler includes a refrigerant generator configured to generate the refrigerant, and a refrigerant sender configured to transmit the generated refrigerant toward the cooling target. The controller controls the refrigerant generator based on at least one of temperature of the cooling target and ambient humidity of the projector.

The projector may be configured such that the refrigerant generator includes a rotating moisture absorption/desorption member, a first blower configured to deliver air to first a part of the moisture absorption/desorption member located in a first area, a heat exchanger coupled to the refrigerant sender, a heater configured to heat a second part of the moisture absorption/desorption member located in a second area different from the first area, and a second blower configured to deliver ambient air of the second part heated by the heater in the moisture absorption/desorption member to the heat exchanger. The heat exchanger is cooled to thereby generate the refrigerant from the air flowed into the heat exchanger. The controller controls at least one of an output of the first blower, an output of the heater, and a cooling degree by the heat exchanger based on at least one of the temperature of the cooling target and the ambient humidity of the projector.

The projector may be configured such that the controller changes at least one of the output of the first blower, the output of the heater, and the cooling degree by the heat exchanger when the temperature of the cooling target is out of a target temperature range.

The projector may be configured such that the controller increases at least one of the output of the first blower, the output of the heater, and the cooling degree by the heat exchanger when the temperature of the cooling target is higher than the target temperature range.

The projector may be configured such that the controller decreases at least one of the output of the first blower, the output of the heater, and the cooling degree by the heat exchanger when the temperature of the cooling target is lower than the target temperature range.

The projector may be configured such that the controller changes all of the output of the first blower, the output of the heater, and the cooling degree by the heat exchanger based on the temperature of the cooling target.

The projector may be configured such that the controller changes at least one of the output of the first blower, the output of the heater, and the cooling degree by the heat exchanger when the ambient humidity of the projector is out of a preset humidity range.

The projector may be configured such that, when the ambient humidity of the projector is higher than the preset humidity range, the controller makes at least one of the output of the first blower, the output of the heater, and the cooling degree by the heat exchanger lower than a level set when the ambient humidity of the projector is within the preset humidity range.

The projector may be configured such that, when the ambient humidity of the projector is lower than the preset humidity range, the controller makes at least one of the output of the first blower, the output of the heater, and the cooling degree by the heat exchanger higher than a level set when the ambient humidity of the projector is within the preset humidity range.

The projector may be configured such that the controller controls all of the output of the first blower, the output of the heater, and the cooling degree by the heat exchanger based on the ambient humidity of the projector.

The projector may be configured such that the controller controls the refrigerant generator based on both of the temperature of the cooling target and the ambient humidity of the projector.

The projector may be configured such that the controller gives priority to a control of the refrigerant generator based on the temperature of the cooling target over a control of the refrigerant generator based on the ambient humidity of the projector.

The projector may be configured such that the cooling target is the light modulator.

DESCRIPTION OF EXEMPLARY EMBODIMENTS

A projector according to an embodiment of the present disclosure will hereinafter be described with reference to the drawings. It should be noted that the scope of the present disclosure is not limited to the embodiments hereinafter described, but can arbitrarily be modified within the technical idea or the technical concept of the present disclosure. Further, in the following drawings, in order to make each constituent easy to understand, each of the structures is made different from the actual structure in scale size, number, and so on in some cases.

First Embodiment

Figure 1:
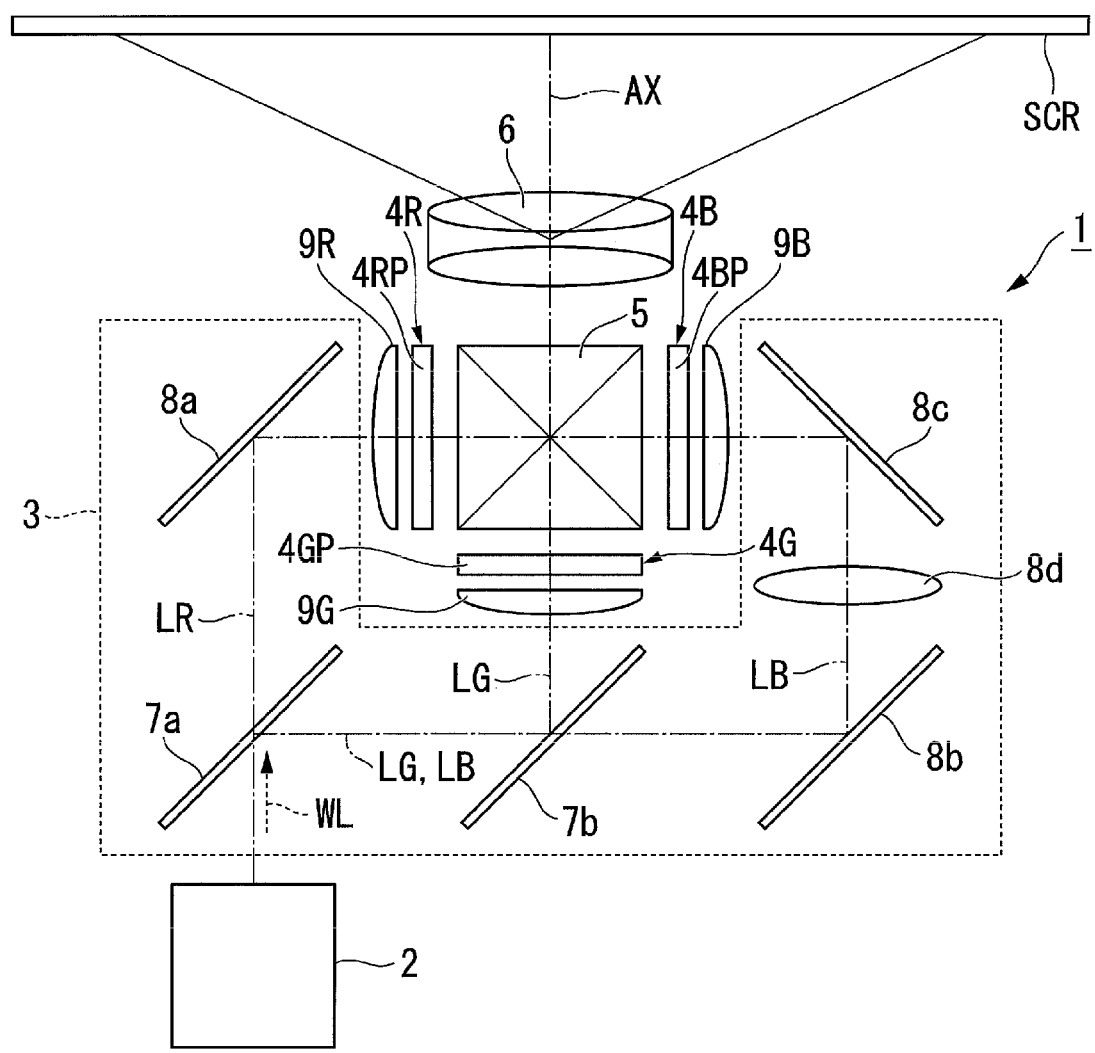
FIG. 1 is a schematic configuration diagram showing a projector according to a first embodiment.
Figure 2:
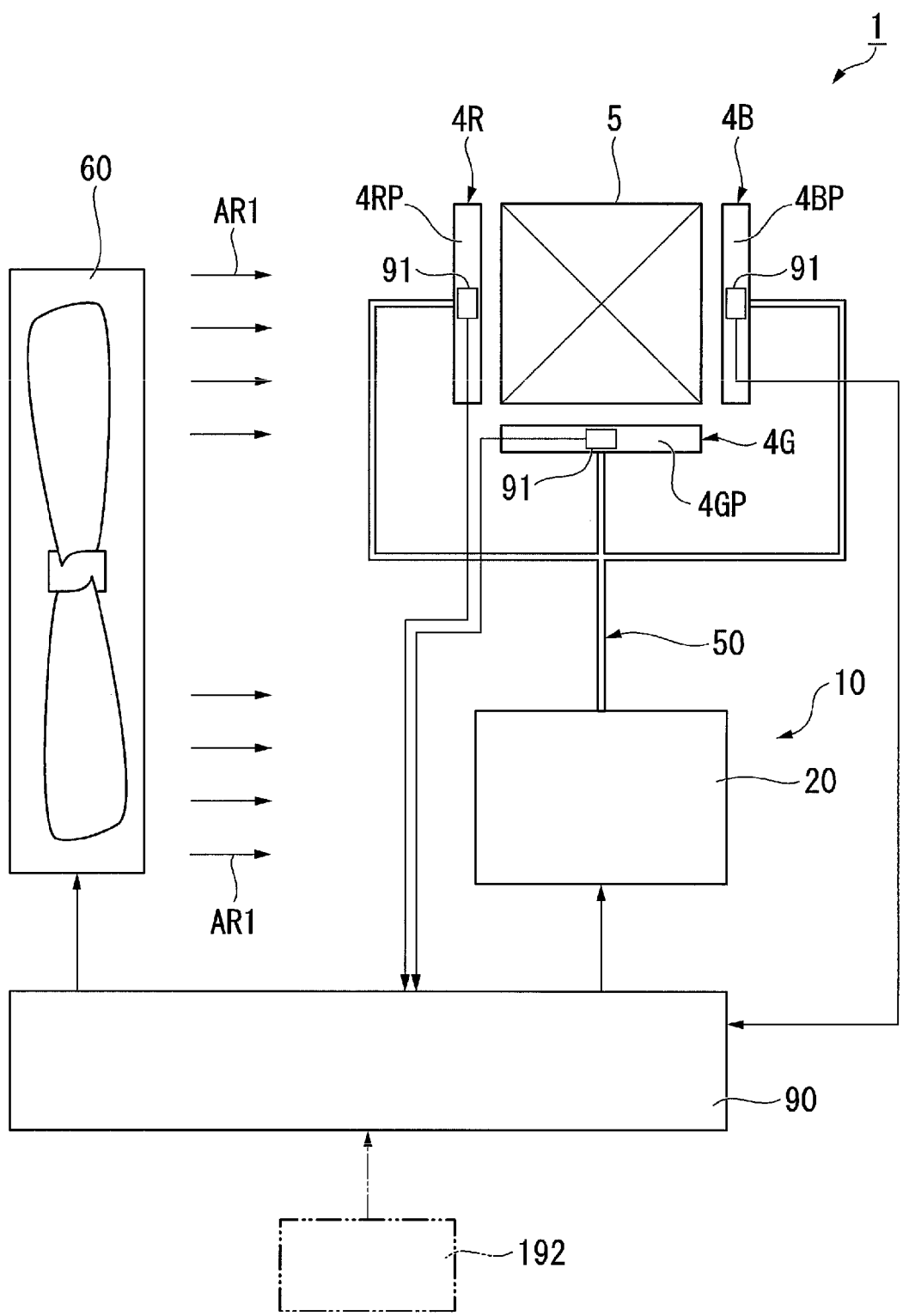
FIG. 2 is a schematic diagram showing a part of the projector according to the first embodiment.

FIG. 1 is a schematic configuration diagram showing the projector 1 according to the present embodiment. FIG. 2 is a schematic diagram showing a part of the projector 1 according to the present embodiment. As shown in FIG. 1, the projector 1 is provided with a light source device 2, a color separation optical system 3, a light modulation unit 4R, a light modulation unit 4G, a light modulation unit 4B, a light combining optical system 5, and a projection optical device 6. The light modulation unit 4R has a light modulator 4RP. The light modulation unit 4G has a light modulator 4GP. The light modulation unit 4B has a light modulator 4BP.

The light source device 2 emits illumination light WL regulated so as to have a substantially homogenous illuminance distribution toward the color separation optical system 3. The light source device 2 has, for example, a semiconductor laser as a light source. The color separation optical system 3 separates the illumination light WL from the light source device 2 into red light LR, green light LG, and blue light LB. The color separation optical system 3 is provided with a first dichroic mirror 7a, a second dichroic mirror 7b, a first reflecting mirror 8a, a second reflecting mirror 8b, a third reflecting mirror 8c, and a relay lens 8d.

The first dichroic mirror 7a separates the illumination light WL having been emitted from the light source device 2 into the red light LR, and the light including the green light LG and the blue light LB mixed with each other. The first dichroic mirror 7a has a property of transmitting the red light LR, while reflecting the green light LG and the blue light LB. The second dichroic mirror 7b separates the light including the green light LG and the blue light LB mixed with each other into the green light LG and the blue light LB. The second dichroic mirror 7b has a property of reflecting the green light LG, while transmitting the blue light LB.

The first reflecting mirror 8a is disposed in the light path of the red light LR, and the red light LR having been transmitted through the first dichroic mirror 7a is reflected by the first reflecting mirror 8a toward the light modulator 4RP. The second reflecting mirror 8b and the third reflecting mirror 8c are disposed in the light path of the blue light LB, and the blue light LB having been transmitted through the second dichroic mirror 7b is guided by the second reflecting mirror 8b and the third reflecting mirror 8c to the light modulator 4BP.

The light modulator 4RP, the light modulator 4GP, and the light modulator 4BP are each formed of a liquid crystal panel. The light modulator 4RP modulates the red light LR out of the light emitted from the light source device 2 in accordance with an image signal. The light modulator 4GP modulates the green light LG out of the light emitted from the light source device 2 in accordance with an image signal. The light modulator 4BP modulates the red light LB out of the light emitted from the light source device 2 in accordance with an image signal. Thus, the light modulators 4RP, 4GP, and 4BP each form image light corresponding to the colored light. Although not shown in the drawings, on the light incident side and the light exit side of each of the light modulators 4RP, 4GP, and 4BP, there are respectively disposed polarization plates.

On the light incident side of the light modulator 4RP, there is disposed a field lens 9R for collimating the red light LR entering the light modulator 4RP. On the light incident side of the light modulator 4GP, there is disposed a field lens 9G for collimating the green light LG entering the light modulator 4GP. On the light incident side of the light modulator 4BP, there is disposed a field lens 9B for collimating the blue light LB entering the light modulator 4BP.

The color combining optical system 5 is formed of across dichroic prism having a substantially cubic shape. The light combining optical system 5 combines the image light of the respective colors from the light modulators 4RP, 4GP, and 4BP with each other. The light combining optical system 5 emits the image light thus combined toward the projection optical device 6. The projection optical device 6 is formed of a projection lens group. The projection optical device 6 projects the image light combined by the light combining optical system 5, namely the light modulated by the light modulators 4RP, 4GP, and 4BP, toward a screen SCR in an enlarged manner. Thus, a color image (picture) thus enlarged is displayed on the screen SCR.

As shown in FIG. 2, the projector 1 is further provided with a cooler 10. The cooler 10 cools a cooling target provided to the projector 1 by a refrigerant W changing to a gas. In the present embodiment, the refrigerant W is, for example, water as a fluid. Therefore, in the following description, the change of the refrigerant W to the gas is simply referred to as evaporation in some cases. In the present embodiment, the cooling target includes the light modulation units 4R, 4G, and 4B. In other words, in the present embodiment, the cooling target includes the light modulators 4RP, 4GP, and 4BP.

The cooler 10 has a refrigerant generator 20 and a refrigerant sender 50. The refrigerant generator 20 is a section for generating the refrigerant W. The refrigerant sender 50 is a section for transmitting the refrigerant W thus generated toward the cooling target. Due to the evaporation of the refrigerant W having been transmitted by the refrigerant sender 50 to the cooling target, namely the light modulation units 4R, 4G, and 4B in the present embodiment, it is possible to draw the heat from the cooling target, and thus, it is possible for the cooler 10 to cool the cooling target. Each of the sections will hereinafter be described in detail.

Figure 3:
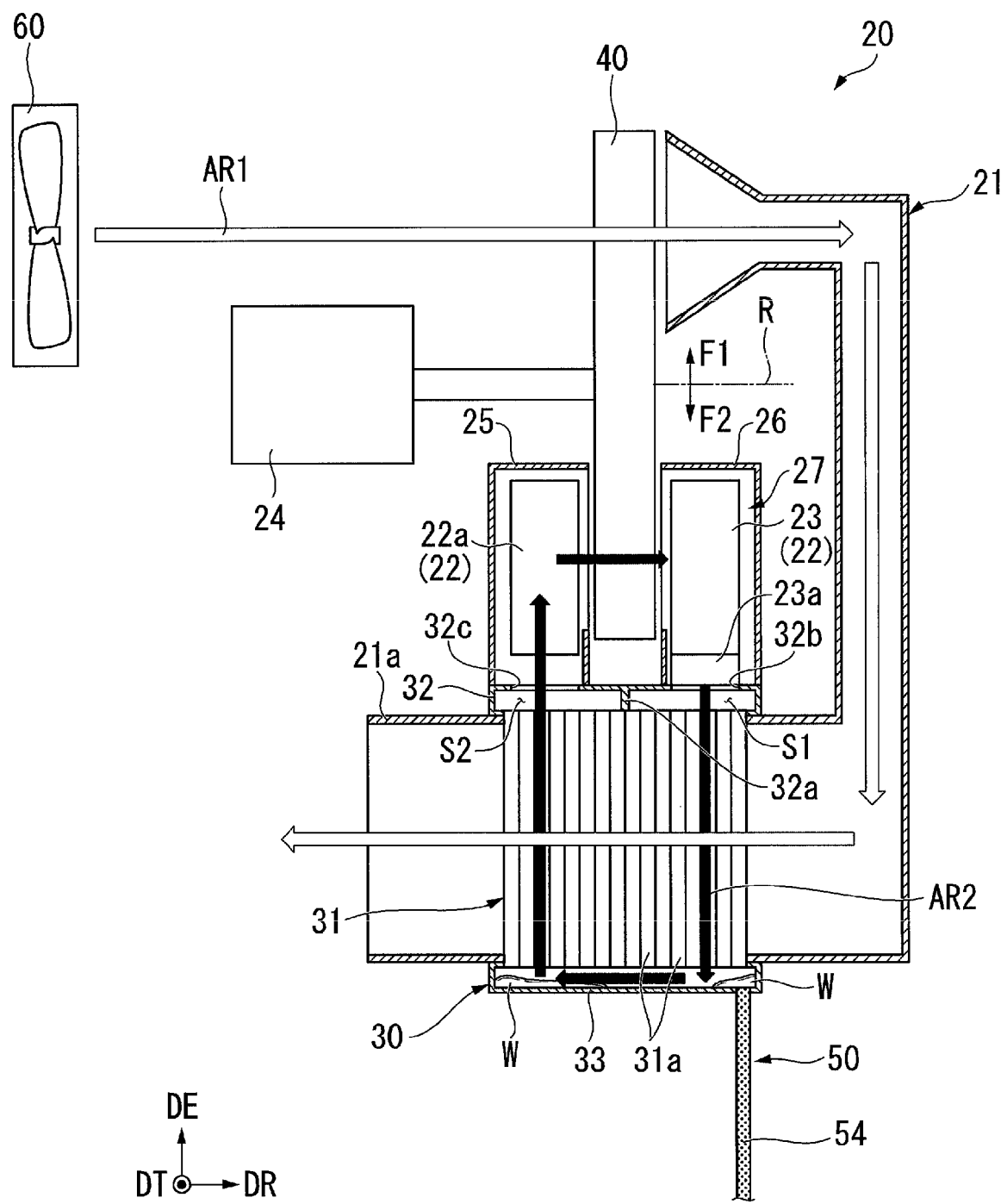
FIG. 3 is a schematic configuration diagram schematically showing a refrigerant generator in the first embodiment.

FIG. 3 is a schematic configuration diagram schematically showing a refrigerant generator 20 in the present embodiment. As shown in FIG. 3, the refrigerant generator 20 has a moisture absorption/desorption member 40, a motor (a driver) 24, a first blower (a cooling blower) 60, a heat exchanger 30, a circulation duct 25, a circulation duct 26, a heater 22, a second blower 23, a cooling duct 21.

Figure 4:
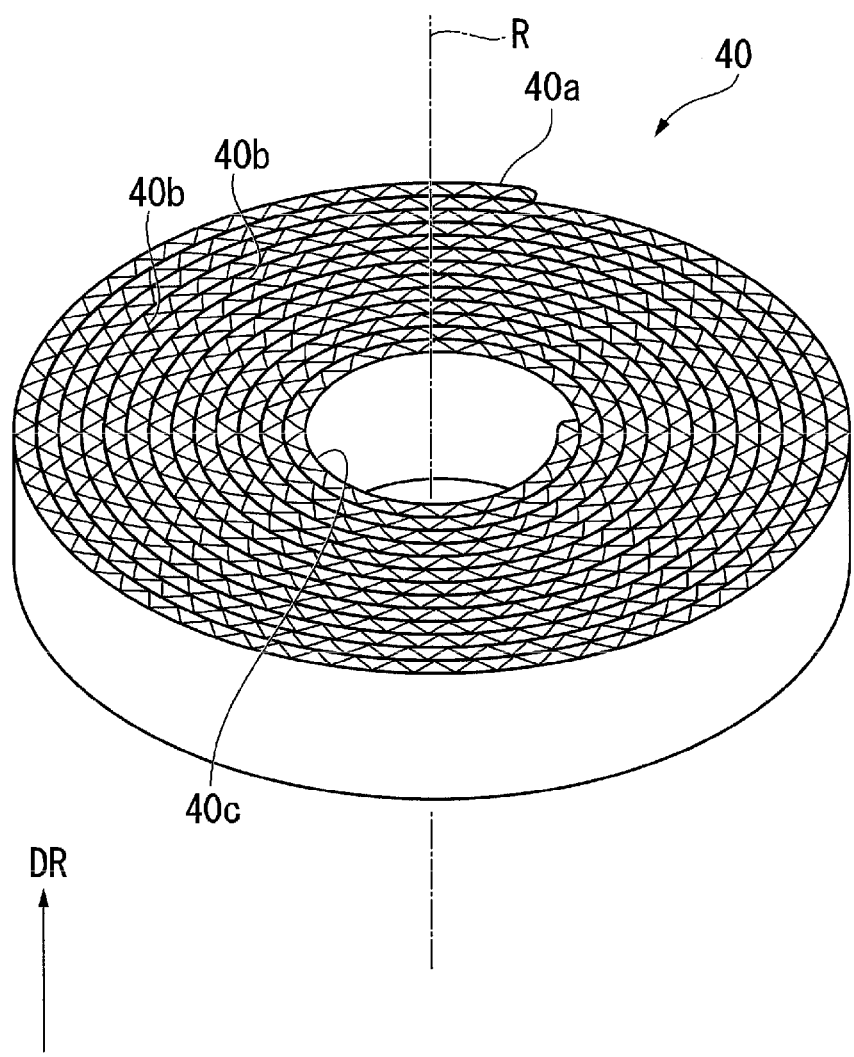
FIG. 4 is a perspective view showing a moisture absorption/desorption member in the first embodiment.

FIG. 4 is a perspective view showing the moisture absorption/desorption member 40. As shown in FIG. 4, the moisture absorption/desorption member 40 has a flat cylindrical shape centered on a rotational axis R. In a central part of the moisture absorption/desorption member 40, there is formed a central hole 40c centered on the rotational axis R. The central hole 40c penetrates the moisture absorption/desorption member 40 in an axial direction of the rotational axis R. The moisture absorption/desorption member 40 rotates around the rotational axis R. In the following description, the axial direction of the rotational axis R is referred to as a "rotational axis direction DR," and is arbitrarily represented by a DR axis in the drawings.

The moisture absorption/desorption member 40 has an infinitely large number of through holes 40b penetrating the moisture absorption/desorption member 40b in the rotational axis direction DR. The moisture absorption/desorption member 40 is a porous member. The moisture absorption/desorption member 40 has a moisture absorption/desorption property. In the present embodiment, the moisture absorption/desorption member 40 is manufactured by, for example, winding a belt-like member 40a shaped like a belt and having the through holes 40b around the rotational axis R, and then coating a surface exposed outside in the belt-like member 40a thus wound with a material having a moisture absorption/desorption property. It should be noted that the surface exposed outside in the belt-like member 40a thus wound includes an outside surface of the moisture absorption/desorption member 40, an inner circumferential surface of the central hole 40c, and internal surfaces of the through holes 40b. It should be noted that the moisture absorption/desorption member 40 can wholly be made of a material provided with the moisture absorption/desorption property. As the material having the moisture absorption/desorption property, there can be cited, for example, zeolite and silica gel.

An output shaft of the motor 24 shown in FIG. 3 is fixed in a state of being inserted into the central hole 40c of the moisture absorption/desorption member 40. The motor 24 rotates the moisture absorption/desorption member 40 around the rotational axis R. The rotational speed of the moisture absorption/desorption member 40 rotated by the motor 24 is, for example, about no lower than 0.2 rpm and no higher than 5 rpm.

The first blower 60 is, for example, an intake fan for taking external air in the projector 1. The first blower 60 feeds air AR1 to apart of the moisture absorption/desorption member 40 located in a first area F1. The first area F1 is an area on one side of the rotational axis R in a direction perpendicular to the rotational axis R. In contrast, in the direction perpendicular to the rotational axis R, an area on the other side of the rotational axis R, namely an area on the opposite side to the first area F1 with respect to the rotational axis R, corresponds to a second area F2. The first area F1 is an area on the upper side of the rotational axis R in FIG. 3. The second area F2 is an area on the lower side of the rotational axis R in FIG. 3.

As shown in FIG. 2, the first blower 60 feeds the air AR1 also to the light modulation units 4R, 4G, and 4B as the cooling target. In other words, in the present embodiment, the first blower 60 is a cooling blower for feeding the air AR1 to the cooling target. The first blower 60 is not particularly limited providing the first blower 60 is capable of feeding the air AR1, and can be, for example, an axial fan or a centrifugal fan.

Figure 5:
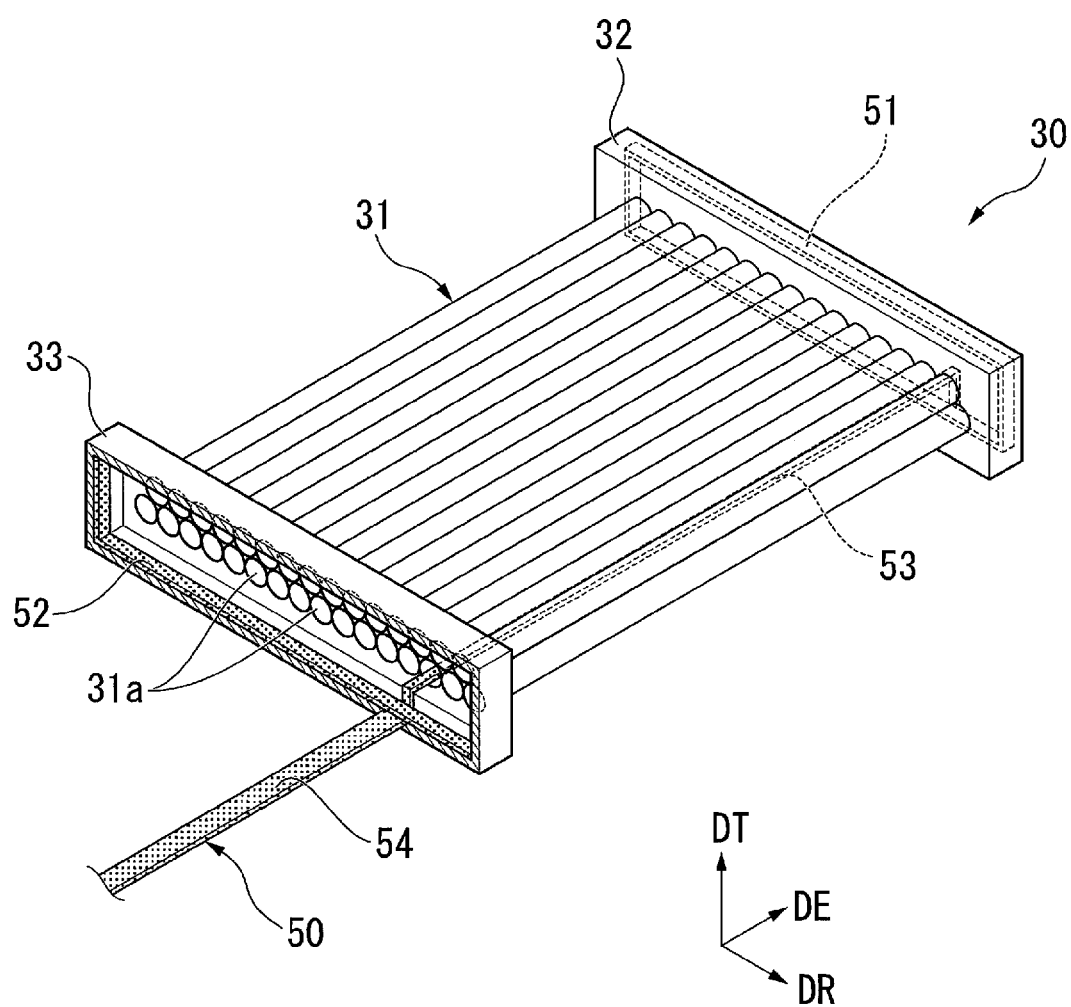
FIG. 5 is a partial cross-sectional perspective view showing a heat exchanger in the first embodiment.

The heat exchanger 30 is a section where the refrigerant W is generated. FIG. 5 is a partial cross-sectional perspective view showing the heat exchanger 30. As shown in FIG. 5, the heat exchanger 30 has a circulation part 31, a first lid part 32, and a second lid part 33.

The circulation part 31 has a plurality of pipe parts 31a each having a tubular shape extending in one direction. In the present embodiment, the one direction in which the pipe parts 31a extend is, for example, perpendicular to the rotational axis direction DR. The pipe parts 31a each open on both sides in the one direction in which the pipe parts 31a extend. A shape of a cross-sectional surface of the pipe part 31a perpendicular to the one direction in which the pipe parts 31a extend is, for example, a circular shape. It should be noted that in the following description, the one direction in which the pipe parts 31a extend is referred to as an "extension direction DE," and is arbitrarily represented by a DE axis in the drawings. The first area F1 and the second area F2 described above are separated in the extension direction DE perpendicular to the rotational axis direction DR with reference to the rotational axis R.

In the present embodiment, the circulation part 31 is formed of a plurality of layers each formed of the plurality of pipe parts 31a arranged along the rotational axis direction DR stacked along a direction perpendicular to both of the rotational axis direction DR and the extension direction DE. It should be noted that in the following description, the direction perpendicular to both of the rotational axis direction DR and the extension direction DE is referred to as a "thickness direction DT," and is arbitrarily represented by a DT axis in the drawings. In the present embodiment, the dimension in the thickness direction DT of the circulation part 31 is smaller than, for example, the dimension in the rotational axis direction DR of the circulation part 31, and is the smallest of the dimensions of the circulation part 31 in the direction perpendicular to the extension direction DE.

The first lid part 32 is coupled to an end part on one side (+DE side) in the extension direction DE in the circulation part 31. The first lid part 32 has a rectangular solid box-like shape elongated in the rotational axis direction DR. Inside the first lid part 32, one ends in the extension direction DE of the pipe parts 31a open. As shown in FIG. 3, inside the first lid part 32, there is disposed a partition part 32a. The partition part 32a separates the inside of the first lid part 32 into a first space S1 and a second space S2 arranged side by side in the rotational axis direction DR. In FIG. 3, the first space S1 is located on the right side (+DR side) of the second space S2.

The first lid part 32 is provided with a communication hole 32b for communicating the first space S1 and the inside of the circulation duct 26 with each other. The first lid part 32 is provided with a communication hole 32c for communicating the second space S2 and the inside of the circulation duct 25 with each other.

The second lid part 33 is coupled to an end part on the other side (−DE side) in the extension direction DE in the circulation part 31, namely an end part on an opposite side to the side where the first lid part 32 is coupled to the circulation part 31. As shown in FIG. 5, the second lid part 33 has a rectangular solid box-like shape elongated in the rotational axis direction DR. Inside the second lid part 33, the other ends in the extension direction DE of the pipe parts 31a open. Unlike the first lid part 32, the inside of the second lid part 33 is not partitioned. The inside of the second lid part 33 is communicated with each of the first space S1 and the second space S2 of the first lid part 32 via the inside of each of the pipe parts 31a of the circulation part 31. The second lid part 33 is coupled to the refrigerant sender 50. Thus, the heat exchanger 30 is coupled to the refrigerant sender 50. It should be noted that in FIG. 5, a wall on the other side in the extension direction DE in the second lid part 33 is omitted.

As shown in FIG. 3, the circulation duct 26 is a duct disposed on one side (+DR side) of the moisture absorption/desorption member 40 in the rotational axis direction DR. The circulation duct 26 has an inflow port opening on the other side (−DR side) in the rotational axis direction DR toward a part of the moisture absorption/desorption member 40 located in the second area F2. The circulation duct 26 has an outflow port to be communicated with the communication hole 32b of the first lid part 32.

The circulation duct 25 is a duct disposed on the other side (−DR side) of the moisture absorption/desorption member 40 in the rotational axis direction DR. The circulation duct 25 has an outflow port opening on the one side (+DR side) in the rotational axis direction DR toward the part of the moisture absorption/desorption member 40 located in the second area F2. The circulation duct 25 has an inflow port to be communicated with the communication hole 32c of the first lid part 32.

The heater 22 has a heating main body part 22a. The heating main body part 22a is disposed inside the circulation duct 25. The heating main body part 22a is disposed on the other side (−DR side) of the part of the moisture absorption/desorption member 40 located in the second area F2 in the rotational axis direction DR. The heating main body part 22a is, for example, an electric heater. The heating main body part 22a heats an inside atmosphere (air) of the circulation duct 25. In the present embodiment, the heater 22 has the second blower 23.

The second blower 23 is disposed inside the circulation duct 26. The second blower 23 is disposed on the one side (+DR side) of the part of the moisture absorption/desorption member 40 located in the second area F2 in the rotational axis direction DR. The second blower 23 is, for example, a centrifugal fan. The air taken from the other side (−DR side) in the rotational axis direction DR is discharged by the second blower 23 toward the other side (−DE side) in the extension direction DE from an exhaust port 23a. The exhaust port 23a opens in the communication hole 32b of the first lid part 32. The second blower 23 feeds the air to the first space S1 via the communication hole 32b.

The air discharged from the second blower 23 to the first space S1 is the air having been taken in from the other side (−DR side) in the rotational axis direction DR of the second blower 23 via the inflow port of the circulation duct 26, and is the air having passed through the part of the moisture absorption/desorption member 40 located in the second area F2. In other words, the second blower 23 makes the air pass through the part of the moisture absorption/desorption member 40 located in the second area F2 different from the first area F1, and then feeds the air to the heat exchanger 30. In the present embodiment, the air which has not passed the part of the moisture absorption/desorption member 40 located in the second area F2 flows inside the circulation duct 25. Therefore, the heating main body part 22a heats the air which has not passed the part of the moisture absorption/desorption member 40 located in the second area F2.

As described above, in the present embodiment, the heater 22 feeds the air which has been heated by the heating main body part 22a to the part of the moisture absorption/desorption member 40 located in the second area F2 by the second blower 23 to thereby heat the part of the moisture absorption/desorption member 40 located in the second area F2. Thus, the second blower 23 feeds the ambient air of the part heated by the heater 22 in the moisture absorption/desorption member 40 to the heat exchanger 30.

The air which has flowed into the heat exchanger 30 from the second blower 23 via the first space S1 passes inside the pipe parts 31a communicated with the first space S1 out of the plurality of pipe parts 31a, and then inflows into the inside of the second lid part 33. The air which has flowed into the inside of the second lid part 33 passes through the inside of the pipe parts 31a communicated with the second space S2 out of the plurality of pipe parts 31a, then inflows into the second space S2, and then inflows into the inside of the circulation duct 25 from the communication hole 32c. The air having flowed into the inside of the circulation duct 25 is heated by the heating main body part 22a, then passes through the part of the moisture absorption/desorption member 40 located in the second area F2 once again, then inflows into the inside of the circulation duct 26, and is then taken in by the second blower 23.

As described hereinabove, in the present embodiment, the refrigerant generator 20 has a circulation channel 27 through which the air discharged from the second blower 23 circulates. The circulation channel 27 is constituted by at least the circulation ducts 25, 26 and the heat exchanger 30. The circulation channel 27 passes the heating main body part 22a, the moisture absorption/desorption member 40, and the heat exchanger 30. Although a narrow gap is provided between the moisture absorption/desorption member 40 and each of the circulation ducts 25, the circulation channel 27 is substantially sealed, and thus, the air from the outside is prevented from inflowing into the inside of the circulation channel 27. It should be noted that in the following description, the air which has been discharged from the second blower 23 and then circulates through the circulation channel 27 is referred to as air AR2.

The cooling duct 21 is a duct having an inflow port disposed on the one side (+DR side) of the part of the moisture absorption/desorption member 40 located in the first area F1 in the rotational axis direction DR. Into the cooling duct 21, there inflows the air AR1 which has been discharged from the first blower 60, and has passed through the part of the moisture absorption/desorption member 40 located in the first area F1. The cooling duct 21 extends from an area on one side of the part of the moisture absorption/desorption member 40 located in the first area F1 toward the heat exchanger 30.

The cooling duct 21 has a cooling passage part 21a extending in the rotational axis direction DR. In the cooling passage part 21a, there is disposed the circulation part 31 of the heat exchanger 30 so as to penetrate in the extension direction DE. Thus, in the inside of the cooling passage part 21a, there is disposed the circulation part 31. The air AR1 passing through the cooling passage part 21a is made to blow against the outside surface of the circulation part 31, and then passes through the circulation part 31 in the rotational axis direction DR. Thus, the circulation part 31 is cooled by the air AR1. In other words, the heat exchanger 30 is cooled by the air AR1 which has been discharged from the first blower 60, and then passed through the moisture absorption/desorption member 40. In FIG. 3, the air AR1 passes through the circulation part 31 from the right side to the left side in the cooling passage part 21a. An end part on the other side (−DR side) in the rotational axis direction DR in the cooling passage part 21a opens. The opening of the cooling passage part 21a is, for example, an outflow port of the cooling duct 21.

When the air AR1 is fed to the part of the moisture absorption/desorption member 40 located in the first area F1 from the first blower 60, the steam included in the air AR1 is absorbed by the part of the moisture absorption/desorption member 40 located in the first area F1. The part of the moisture absorption/desorption member 40 having absorbed the steam as the moisture moves from the first area F1 to the second area F2 by the motor 24 rotating the moisture absorption/desorption member 40. Then, through the part of the moisture absorption/desorption member 40 located in the second area F2, there passes the air AR2 which has been heated by the heating main body part 22a, and is relatively high in temperature. Thus, the moisture having been absorbed by the moisture absorption/desorption member 40 evaporates to be released to the air AR2.

The air AR2 including the steam which has been absorbed from the air AR1 by passing through the moisture absorption/desorption member 40 is fed by the second blower 23 to the heat exchanger 30. The air AR2 having flowed into the heat exchanger 30 from the first space S1 flows through the circulation part 31. More particularly, the air AR2 flows through the pipe parts 31a of the circulation part 31. The circulation part 31 is cooled from the outside by the air AR1 flowing along the rotational axis direction DR through the cooling passage part 21a of the cooling duct 21.

When the circulation part 31 is cooled, the air AR2 which flows through the pipe parts 31a and is relatively high in temperature is cooled, and thus, the steam having been included in the air AR2 is condensed to the water as a fluid, namely the refrigerant W. In such a manner, the heat exchanger 30 is cooled to thereby generate the refrigerant W from the air AR2 having flowed into the heat exchanger 30.

In the present embodiment, the refrigerant sender 50 is formed of a porous member, and transmits the refrigerant W due to a capillary action. As the material of the refrigerant sender 50, there can be cited, for example, polypropylene, cotton, and porous metal. It is preferable for the material of the refrigerant sender 50 to be a material capable of making the surface tension of the refrigerant sender 50 relatively high. As shown in FIG. 5, the refrigerant sender 50 has a first trapping part 51, a second trapping part 52, a third trapping part 53, and a coupling part 54.

The first trapping part 51 is fixed to an edge part on the one side (+DE side) in the extension direction DE in the inside surface of the first lid part 32. The first trapping part 51 is shaped like a thin belt, and is formed along the edge part of the first lid part 32 to have a rectangular frame shape. The second trapping part 52 is fixed to an edge part on the other side (−DE side) in the extension direction DE in the inside surface of the second lid part 33. The second trapping part 52 is shaped like a thin belt, and is formed along the edge part of the second lid part 33 to have a rectangular frame shape.

The third trapping part 53 extends from the first trapping part 51 to the second trapping part 52 through the inside of the pipe part 31a to couple the first trapping part 51 and the second trapping part 52 to each other. The third trapping part 53 is shaped like a thin belt extending in the extension direction DE. In the present embodiment, the third trapping part 53 is disposed inside one of the pipe parts 31a as shown in FIG. 5, but this is not a limitation. The third trapping part 53 can be disposed inside some of the pipe parts 31a, or can also be disposed inside all of the pipe parts 31a. When the third trapping part 53 is disposed inside some of the pipe parts 31a, it is also possible for the third trapping part 53 to be disposed inside two or more of the pipe parts 31a.

Figure 6:
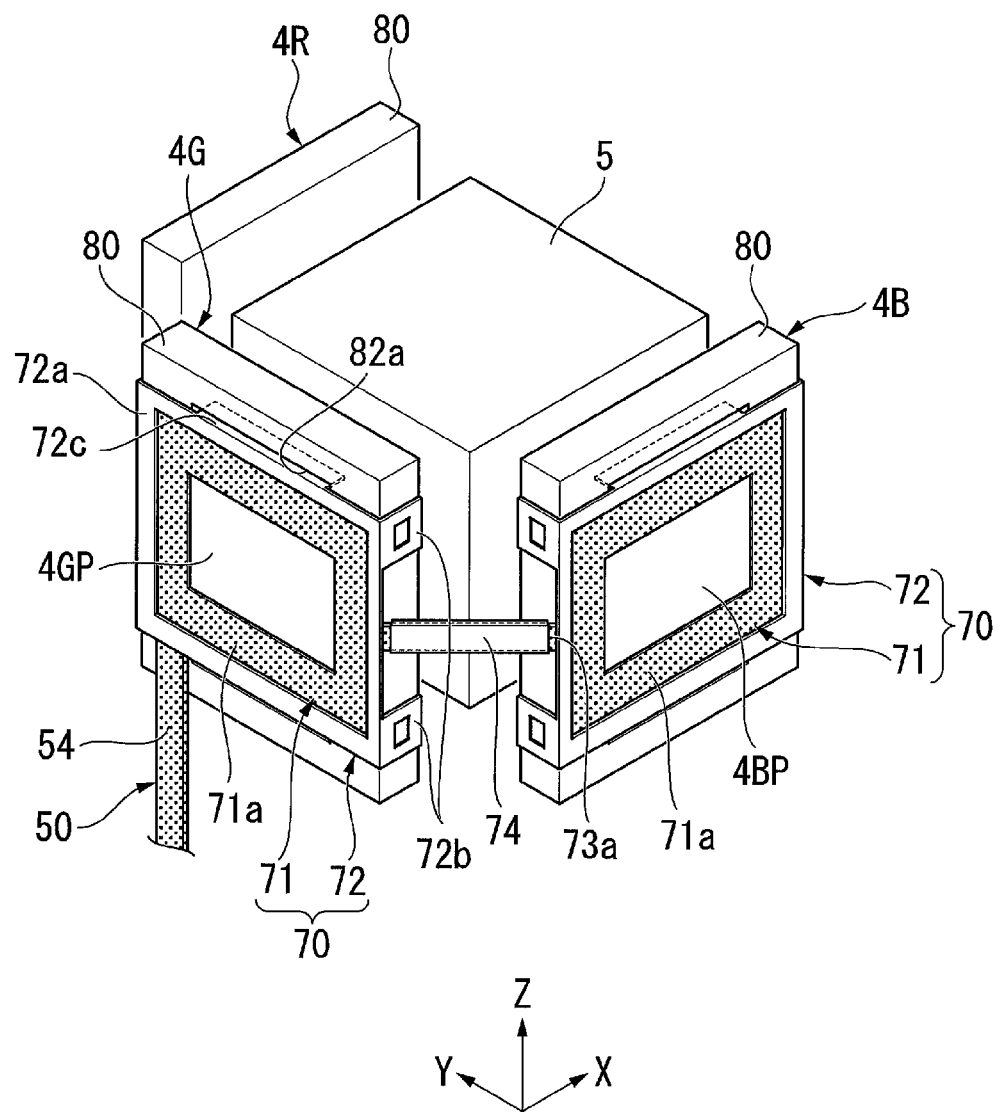
FIG. 6 is a perspective view showing light modulation units and a light combining optical system in the first embodiment.

The coupling part 54 is a part for coupling the refrigerant generator 20 and the cooling target to each other. In the present embodiment, the coupling part 54 is coupled to the second trapping part 52, and projects from the inside of the second lid part 33 to the outside of the second lid part 33 so as to penetrate the wall of the second lid part 33. As shown in FIG. 6, the coupling part 54 projecting to the outside of the second lid part 33 extends to the light modulation unit 4G as the cooling target. FIG. 6 is a perspective view showing the light modulation units 4R, 4G, and 4B, and the light combining optical system 5. The coupling part 54 is shaped like a thin belt. The width of the coupling part 54 is larger than, for example, the width of the first trapping part 51, the width of the second trapping part 52, and the width of the third trapping part 53.

Then, the light modulation units 4R, 4G, and 4B as the cooling target in the present embodiment will be described in more detail. In the following description, a vertical direction Z defining a positive side as an upper side and a negative side as a lower side is arbitrarily represented by a Z axis in the drawings. A direction parallel to an optical axis AX of a projection lens the closest to the light exit side in the projection optical device 6, namely a direction parallel to the projection direction of the projection optical device 6, is referred to as an "optical axis direction X," and is arbitrarily represented by an X axis in the drawings. The optical direction X is perpendicular to the vertical direction Z. Further, a direction perpendicular to both of the optical axis direction X and the vertical direction Z is referred to as a "width direction Y," and is arbitrarily represented by a Y axis in the drawings.

It should be noted that the vertical direction Z, the upper side, and the lower side are mere names for explaining the relative positional relationship between the constituents, and the actual arrangement relationship and so on can also be other arrangement relationships and so on than the arrangement relationships and so on represented by these names.

Figure 7:
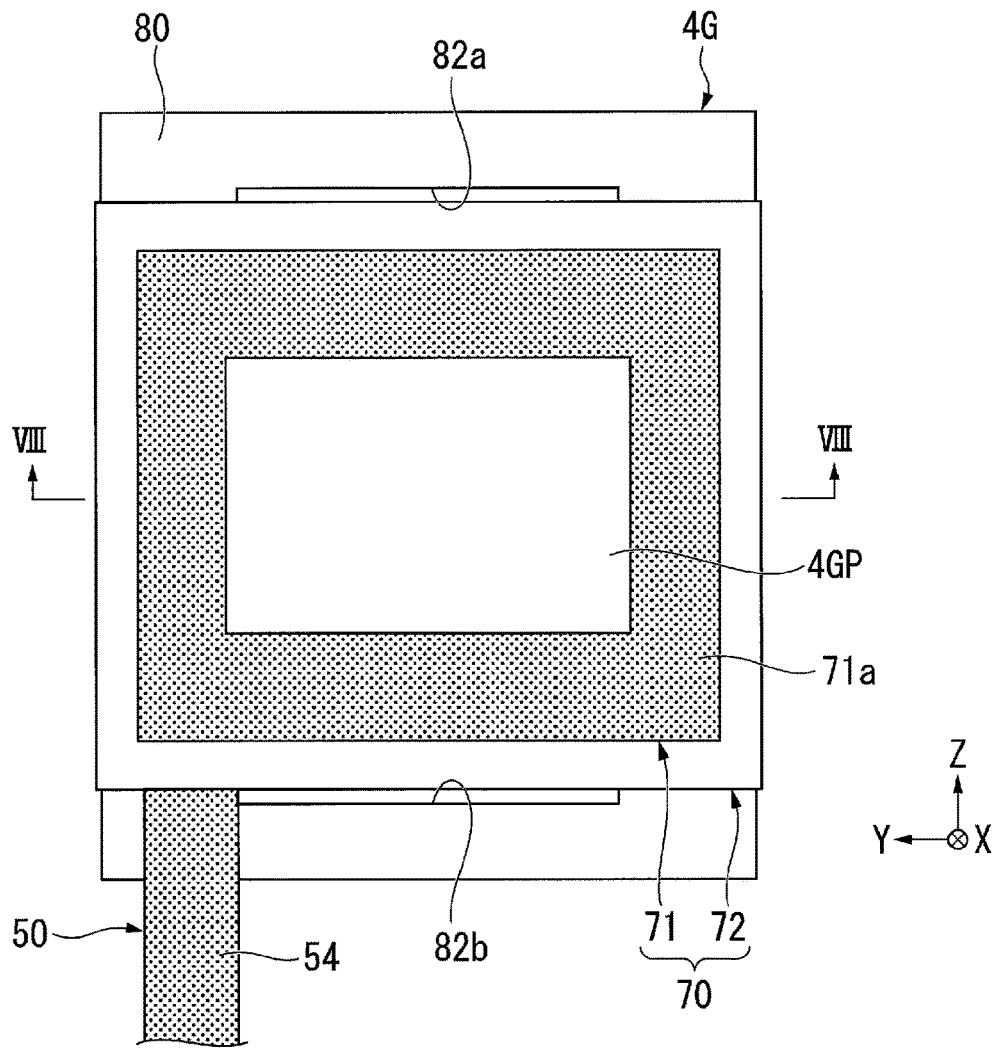
FIG. 7 is a diagram of the light modulation unit in the first embodiment viewed from a light incident side.
Figure 8:
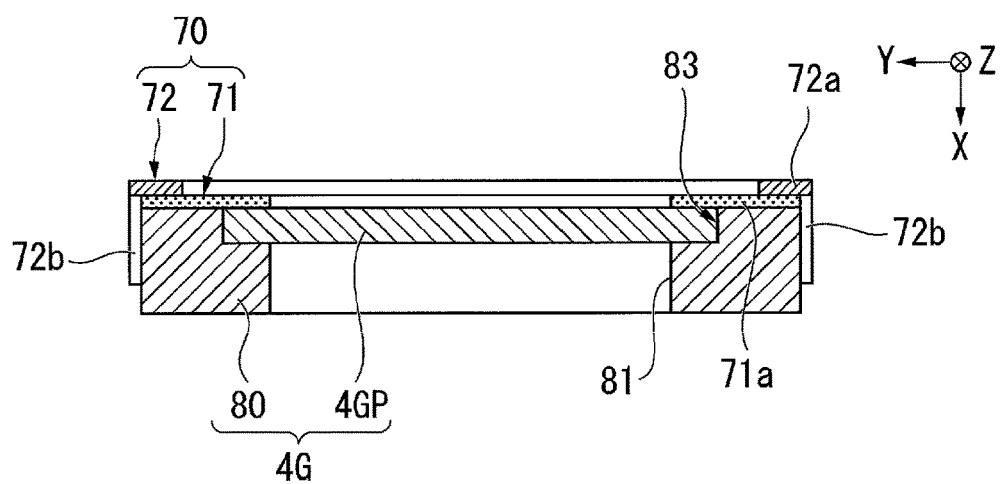
FIG. 8 is a diagram showing the light modulation unit in the first embodiment, and is a VIII-VIII cross-sectional view in FIG. 7.

FIG. 7 is a diagram of the light modulation unit 4G viewed from a light incident side. FIG. 8 is a diagram showing the light modulation unit 4G, and corresponds to an VIII-VIII cross-sectional view in FIG. 7.

As shown in FIG. 6, the light modulation unit 4R, the light modulation unit 4G, and the light modulation unit 4B as the cooling target are disposed so as to surround the light combining optical system 5. The light modulation unit 4R and the light modulation unit 4B are disposed across the light combining optical system 5 from each other in the width direction Y. The light modulation unit 4G is disposed on the light incident side (−X side) in the optical axis direction X of the light combining optical system 5. Since the structure of the light modulation unit 4R, the structure of the light modulation unit 4G, and the structure of the light modulation unit 4B are substantially the same as each other except the arrangement position and the arrangement posture, in the following description, the light modulation unit 4G is described alone as a representative in some cases.

The light modulation unit 4G has a holding frame 80 for holding the light modulator 4GP. As shown in FIG. 6 through FIG. 8, the holding frame 80 is shaped like a substantially rectangular solid flat in a direction in which the light enters the light modulator 4GP and elongated in the vertical direction Z. The direction in which the light enters the light modulator 4GP is, for example, the optical axis direction X.

As shown in FIG. 8, the holding frame 80 has a through hole 81 penetrating the holding frame 80 in the incident direction of the light. On the edge on the light incident side (−X side) of the through hole 81, there is disposed a step part 83 where the width of the through hole 81 increases. The light modulator 4GP is fitted in the step part 83 and held by the holding frame 80. As shown in FIG. 7, in the portions on the both sides in the vertical direction Z in the surface on the light incident side of the holding frame 80, there are formed insertion grooves 82*a*, 82*b*.

As shown in FIG. 6 through FIG. 8, the projector 1 is further provided with a cooling promotion section 70 installed in the light modulation unit 4G as the cooling target. The cooling promotion section 70 has a refrigerant holder 71 and a fixation member 72. The refrigerant holder 71 is attached to a surface of the holding frame 80 of the light modulation unit 4G as the cooling target. In the present embodiment, the refrigerant holder 71 is disposed on a surface on the light incident side (−X side) of the light modulator 4GP in the holding frame 80. The refrigerant holder 71 is formed of a porous member for retaining the refrigerant W. As the material of the refrigerant holder 71, there can be cited, for example, polypropylene, cotton, and porous metal. The material of the refrigerant holder 71 can be made the same as the material of, for example, the refrigerant sender 50. It is preferable for the material of the refrigerant holder 71 to be a material capable of making the surface tension of the refrigerant holder 71 relatively high.

Figure 9:
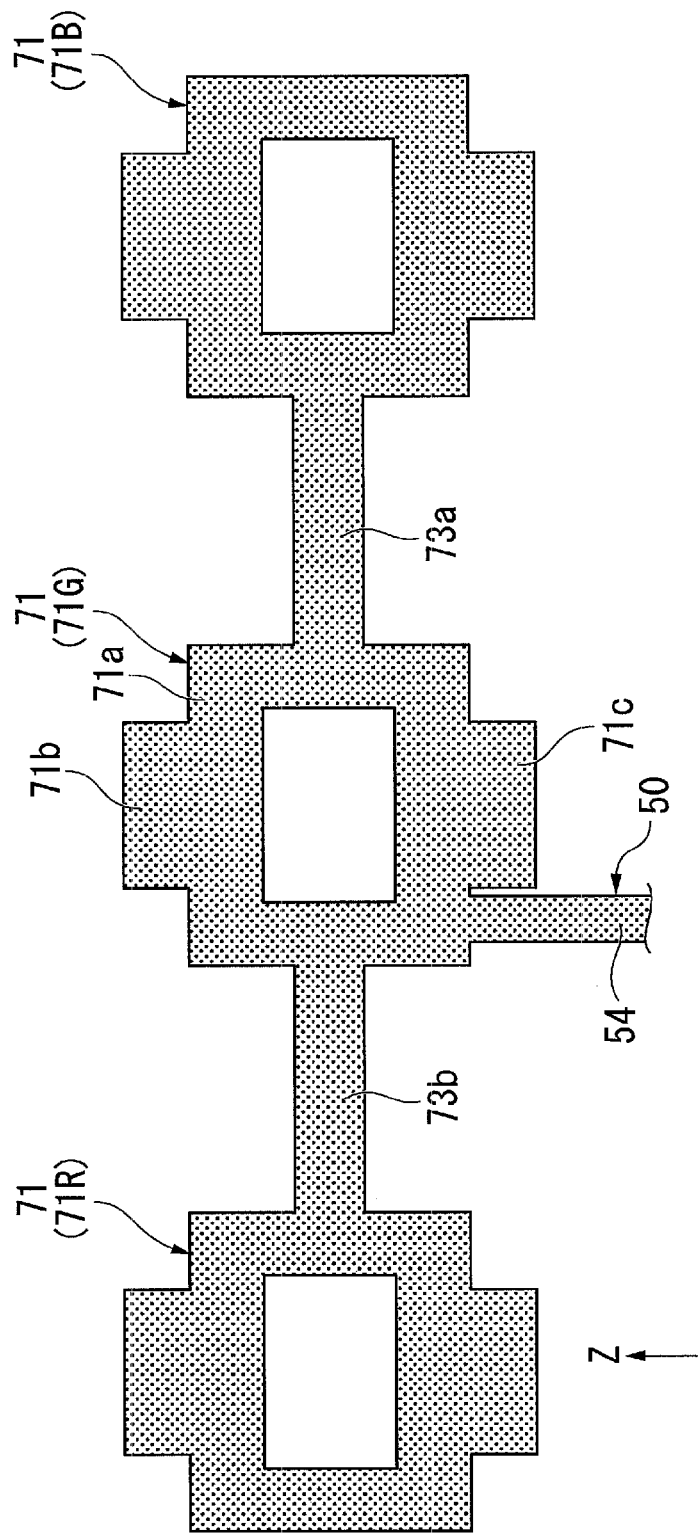
FIG. 9 is a diagram showing a refrigerant holder in the first embodiment.

FIG. 9 is a diagram showing the refrigerant holder 71. As shown in FIG. 9, the refrigerant holder 71 has a main body part 71*a* shaped like a rectangular frame, and insertion parts 71*b*, 71*c* disposed in end parts on both sides in the vertical direction Z in the main body part 71*a*. As shown in FIG. 8, the main body part 71*a* covers a part of the surface on the light incident side (−X side) of the light modulator 4GP in the holding frame 80. A portion on an inner edge side in the main body part 71*a* covers an outer edge portion of the light modulator 4GP. The insertion part 71*b* is folded, and is inserted in the insertion groove 82*a* of the holding frame 80. The insertion part 71*c* is folded, and is inserted in the insertion groove 82*b* of the holding frame 80.

The fixation member 72 is a member for fixing the refrigerant holder 71. As shown in FIG. 6 and FIG. 8, the fixation member 72 is a plate like member. The fixation member 72 is made of, for example, metal. The fixation member 72 has a frame part 72*a* shaped like a rectangular frame, attachment parts 72*b*, and insertion parts 72*c*. As shown in FIG. 7 and FIG. 8, the frame part 72*a* covers an outer edge part of the refrigerant holder 71. The holding frame 80, the refrigerant holder 71, and the frame part 72*a* are stacked on one another in a direction (the optical axis direction X) of the light passing through the light modulation unit 4G. In the following description, the direction in which the holding frame 80, the refrigerant holder 71, and the frame part 72*a* are stacked on one another is simply referred to as a "stacking direction." The fixation member 72 fixes the refrigerant holder 71 by sandwiching the refrigerant holder 71 between the frame part 72*a* and the holding frame 80 in the stacking direction (the optical axis direction X).

An inner edge of the frame part 72*a* is disposed on the outer side of an inner edge of the refrigerant holder 71. Therefore, apart of the refrigerant holder 71, namely a portion on the inner side of the frame part 72*a* in the present embodiment, is exposed when viewed from the fixation member 72 side in the stacking direction.

As shown in FIG. 6 and FIG. 8, the attachment parts 72*b* are respectively provided to both end parts in the width direction Y in the both end parts in the vertical direction Z of the frame part 72*a*. The attachment parts 72*b* each project from the frame part 72*a* toward the holding frame 80 (+X side). The attachment parts 72*b* are respectively engaged with protrusions disposed on the side surfaces of the holding frame 80. Thus, the fixation member 72 is fixed to the holding frame 80.

The insertion parts 72*c* are disposed on both end parts in the vertical direction Z of the frame part 72*a*. The insertion parts 72*c* each project from the frame part 72*a* toward the holding frame 80 (+X side). The insertion parts 72*c* are respectively inserted in the insertion grooves 82*a*, 82*b* of the holding frame 80. The insertion parts 72*c* press the insertion parts 71*b*, 71*c* of the refrigerant holder 71 inside the insertion grooves 82*a*, 82*b*, respectively.

The cooling promotion section 70 is provided to each of the light modulation units 4R, 4G, and 4B. In other words, the refrigerant holder 71 and the fixation member 72 are provided to each of the light modulation units 4R, 4G, and 4B. As shown in FIG. 9, the refrigerant holder 71G provided to the light modulation unit 4G out of the light modulation units 4R, 4G, and 4B is coupled to the refrigerant sender 50. More particularly, a coupling part 54 of the refrigerant sender 50 is coupled to a lower end part of the refrigerant holder 71G.

The refrigerant holder 71B attached to the light modulation unit 4B and the refrigerant holder 71R attached to the light modulation unit 4R are substantially the same as the refrigerant holder 71G attached to the light modulation unit 4G except the point that the coupling part 54 is not coupled thereto.

In the present embodiment, on both sides of the refrigerant holder 71G attached to the light modulation unit 4G, there are disposed the junction parts 73*a*, 73*b* to which the refrigerant holder 71B attached to the light modulation unit 4B and the refrigerant holder 71R attached to the light modulation unit 4R are respectively joined. The junction parts 73*a*, 73*b* are each made of a porous member.

The junction part 73*a* joins the refrigerant holder 71G attached to the light modulation unit 4G and the refrigerant holder 71B attached to the light modulation unit 4B to each other. Thus, the refrigerant holder 71B is coupled to the coupling part 54 of the refrigerant sender 50 via the refrigerant holder 71G. As shown in FIG. 6, the junction part 73*a* is provided with a cover part 74 for covering the junction part 73*a*. The cover part 74 is, for example, a film made of resin.

The junction part 73*b* joins the refrigerant holder 71 attached to the light modulation unit 4G and the refrigerant holder 71 attached to the light modulation unit 4R to each other. Thus, the refrigerant holder 71R is coupled to the coupling part 54 of the refrigerant sender 50 via the refrigerant holder 71G. Although not shown in the drawings, the junction part 73*b* is also provided with the cover part 74 similarly to the junction part 73*a*.

The refrigerant W generated by the refrigerant generator 20 is transmitted to the refrigerant holder 71G using the coupling part 54 of the refrigerant sender 50. The refrigerant W transmitted to the refrigerant holder 71G is transmitted to the refrigerant holder 71B via the junction part 73*a*, and at the same time, transmitted to the refrigerant holder 71R via the junction part 73*b*. In such a manner, the refrigerant W generated in the refrigerant generator 20 is transmitted to the three light modulation units 4R, 4G, and 4B. Then, the refrigerant W transmitted to and then retained in the refrigerant holder 71 is evaporated, and thus, the light modulation units 4R, 4G, and 4B as the cooling target are cooled. More particularly, by the refrigerant W retained in the refrigerant holder 71 evaporating, the holding frame 80 attached with the refrigerant holder 71 is cooled, and by the holding frame 80 being cooled, the light modulators 4RP, 4GP, and 4BP held by the holding frame 80 are cooled. Thus, it is possible to cool the light modulators 4RP, 4GP, and 4BP as the cooling target with the cooler 10.

As shown in FIG. 2, the projector 1 is further provided with a temperature sensor 91 capable of measuring the temperature of the cooling target, and a controller 90 for controlling the cooler 10. In the present embodiment, the temperature sensor 91 is provided to each of the light modulation units 4R, 4G, and 4B as the cooling target. The temperature sensors 91 are capable of respectively measuring the temperature of the light modulation units 4R, 4G, and 4B as the cooling target. More particularly, the temperature sensors 91 are capable of respectively measuring the temperature of the light modulators 4RP, 4GP, and 4BP. The measuring result of each of the temperature sensors 91 is transmitted to the controller 90.

In the present embodiment, the controller 90 controls the refrigerant generator 20 based on the temperature of the cooling target. The controller 90 controls at least one of the output of the first blower 60, the output of the heater 22, and a cooling degree by the heat exchanger 30 based on the temperature of the light modulators 4RP, 4GP, and 4BP obtained from the temperature sensors 91. In the present embodiment, the controller 90 controls all of the output of the first blower 60, the output of the heater 22, and the cooling degree by the heat exchanger 30 based on the temperature of the light modulators 4RP, 4GP, and 4BP.

The controller 90 controls a voltage to be applied to the first blower 60 to thereby control the output of the first blower 60 and the cooling degree of the heat exchanger 30. When the voltage to be applied to the first blower 60 increases, the output of the first blower 60 increases, and the amount of the air AR1 fed by the first blower 60 increases. Therefore, the amount of the air AR1 fed to the moisture absorption/desorption member 40 increases, and thus, it is possible to increase the amount of the steam absorbed as moisture by the moisture absorption/desorption member 40 from the air AR1. Thus, it is possible to increase the amount of the steam to be released to the air AR2 from the moisture absorption/desorption member 40, and thus, it is possible to increase the amount of the steam condensed in the heat exchanger 30. Therefore, it is possible to increase the amount of generation of the refrigerant W in the refrigerant generator 20.

Further, when the voltage to be applied to the first blower 60 increases, the amount of the air AR1 blowing against the circulation part 31 from the first blower 21 via the cooling duct 21 increases. Thus, it is possible to increase the cooling degree of the heat exchanger 30, and thus, it is possible to further cool the heat exchanger 30. Therefore, it is possible to further condense the steam included in the air AR2 fed into the circulation part 31, and thus, it is possible to increase the amount of generation of the refrigerant W in the refrigerant generator 20.

In contrast, when the voltage to be applied to the first blower 60 decreases, the output of the first blower 60 decreases, and the amount of the air AR1 fed from the first blower 60 to the moisture absorption/desorption member 40 and the circulation part 31 decreases. Thus, the amount of the steam absorbed as moisture by the moisture absorption/desorption member 40 decreases, and at the same time, the cooling degree by the heat exchanger 30 decreases. Therefore, it is possible to decrease the amount of the steam condensed in the heat exchanger 30, and thus, it is possible to decrease the amount of generation of the refrigerant W in the refrigerant generator 20.

The controller 90 controls the voltage to be applied to the heating main body part 22a to thereby control the output of the heater 22. When the voltage to be applied to the heating main body part 22a increases, the output of the heater 22 increases, and it is easier to heat the moisture absorption/desorption member 40 by the heater 22. Therefore, it is possible to increase the amount of the steam to be released from the moisture absorption/desorption member 40 to the air AR2. Thus, in the heat exchanger 30, it is possible to condense a larger amount of steam from the air AR2. Therefore, it is possible to increase the amount of generation of the refrigerant W in the refrigerant generator 20. In contrast, when the voltage to be applied to the heating main body part 22a decreases, the output of the heater 22 decreases, and thus, the amount of the steam to be released from the moisture absorption/desorption member 40 to the air AR2 decreases. Therefore, it is possible to decrease the amount of the steam condensed in the heat exchanger 30, and thus, it is possible to decrease the amount of generation of the refrigerant W in the refrigerant generator 20.

Figure 10:
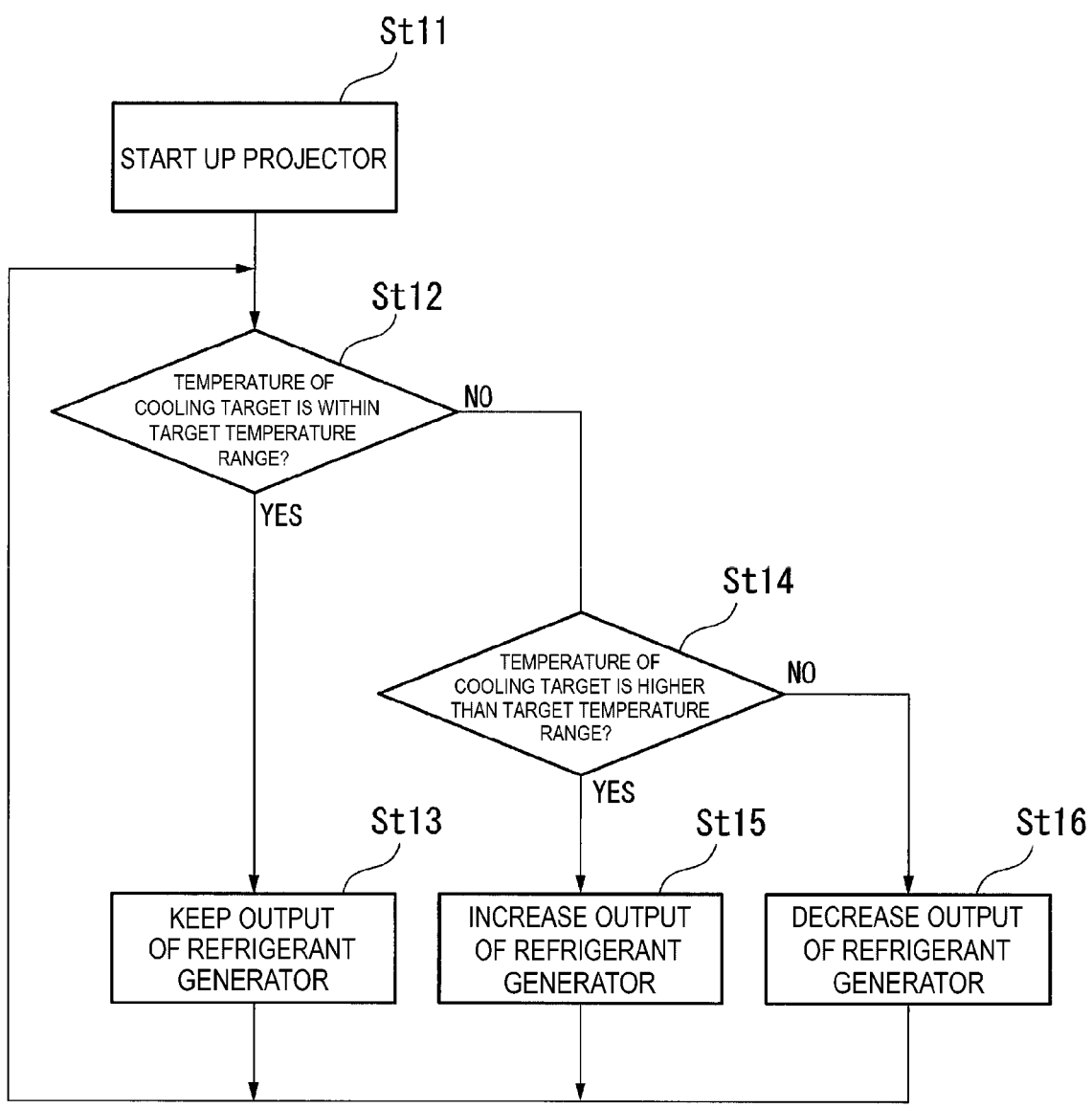
FIG. 10 is a flowchart showing an example of a procedure of controlling a controller in the first embodiment.

FIG. 10 is a flowchart showing an example of a procedure of controlling the controller 90 in the present embodiment. In the present embodiment, the controller 90 performs cooling of the cooling target by the cooler 10 with a goal of keeping the temperature of the cooling target within a target temperature range along the procedure shown in FIG. 10. The target temperature range is, for example, a temperature range set in advance. The target temperature range is, for example, a temperature range of the cooling target in which the operation and the state of the cooling target can be kept in a good condition when the projector 1 is in operation. When the cooling target is the light modulators 4RP, 4GP, and 4BP as in the present embodiment, the target temperature range is, for example, no higher than 40° C. and no lower than 60° C.

As shown in FIG. 10, the controller 90 determines (step St12) whether or not the temperature of the cooling target is within the target temperature range after the projector 1 has started up (step St11). In the present embodiment, the controller 90 determines whether or not the temperature of the light modulators 4RP, 4GP, and 4BP is within the target temperature range based on the measuring result by the temperature sensors 91. When the temperature of the cooling target is within the target temperature range (YES in the step St12), the controller 90 keeps (step St13) the output of the refrigerant generator 20 in the current output. In other words, the controller 90 keeps the output of the first blower 60, the output of the heater 22, and the cooling degree by the heat exchanger 30 in the current state without making changes.

In contrast, when the temperature of the cooling target is out of the target temperature range (NO in the step St12), the controller 90 determines (step St14) whether or not the temperature of the cooling target is higher than the target temperature range. In the present embodiment, the controller 90 determines whether or not the temperature of the light modulators 4RP, 4GP, and 4BP is higher than the target temperature range based on the measuring result by the temperature sensors 91.

It should be noted that in the present embodiment, the controller 90 determines that the temperature of the cooling target is out of the target temperature range when the temperature is out of the target temperature range in at least one of the three light modulators 4RP, 4GP, and 4BP even when the temperature is within the target temperature range in the rest of the light modulators.

When the temperature of the cooling target is higher than the target temperature range (YES in the step St14), the controller 90 increases (step St15) the output of the refrigerant generator 20. In other words, the controller 90 increases the output of the first blower 60, the output of the heater 22, and the cooling degree by the heat exchanger 30. Specifically, the controller 90 raises the voltage to be applied to the first blower 60 and the voltage to be applied to the heating main body part 22a.

The degree of increasing the output of the refrigerant generator 20 can be set to a predetermined value in advance, or can also be set in accordance with a difference between the temperature of the cooling target and the upper limit value of the target temperature range, for example. When setting the degree of increasing the output of the refrigerant generator 20 in accordance with the difference between the temperature of the cooling target and the upper limit of the target temperature range, it is possible for the controller 90 to set the degree of increasing the output of the refrigerant generator 20 so that, for example, the larger the difference between the temperature of the cooling target and the upper limit of the target temperature range is, the higher the degree of increasing the output of the refrigerant generator 20 is.

In the present embodiment, the degree of increasing the output of the refrigerant generator 20 means a voltage value raised in the voltage to be applied to the first blower 60 and a voltage value raised in the voltage to be applied to the heating main body part 22a. The voltage value raised in the voltage to be applied to the first blower 60 and the voltage value raised in the voltage to be applied to the heating main body part 22a can be the same as each other, or can also be different from each other.

In contrast, when the temperature of the cooling target is lower than the target temperature range (NO in the step St14), the controller 90 decreases (step St16) the output of the refrigerant generator 20. In other words, the controller 90 decreases the output of the first blower 60, the output of the heater 22, and the cooling degree by the heat exchanger 30. Specifically, the controller 90 lowers the voltage to be applied to the first blower 60 and the voltage to be applied to the heating main body part 22a.

The degree of decreasing the output of the refrigerant generator 20 can be set to a predetermined value in advance, or can also be set in accordance with the difference between the temperature of the cooling target and the lower limit value of the target temperature range, for example. When setting the degree of decreasing the output of the refrigerant generator 20 in accordance with the difference between the temperature of the cooling target and the lower limit of the target temperature range, it is possible for the controller 90 to set the degree of decreasing the output of the refrigerant generator 20 so that, for example, the larger the difference between the temperature of the cooling target and the lower limit of the target temperature range is, the higher the degree of decreasing the output of the refrigerant generator 20 is.

In the present embodiment, the degree of decreasing the output of the refrigerant generator 20 means a voltage value lowered in the voltage to be applied to the first blower 60 and a voltage value lowered in the voltage to be applied to the heating main body part 22a. The voltage value lowered in the voltage to be applied to the first blower 60 and the voltage value lowered in the voltage to be applied to the heating main body part 22a can be the same as each other, or can also be different from each other.

The degree of raising the output of the refrigerant generator 20 in the step St15 and the degree of decreasing the output of each of the sections in the step St16 can be the same as each other, or can also be different from each other. In other words, the absolute value of the increment in the voltage to be applied to the first blower 60 in the step St15 and the absolute value of the decrement in the voltage to be applied to the first blower 60 in the step St16 can be the same as each other, or can also be different from each other. The absolute value of the increment in the voltage to be applied to the heating main body part 22a in the step St15 and the absolute value of the decrement in the voltage to be applied to the heating main body part 22a in the step St16 can be the same as each other, or can also be different from each other.

In such a manner as described above, the controller 90 changes at least one of the output of the first blower 60, the output of the heater 22, and the cooling degree by the heat exchanger 30 when the temperature of the light modulation units 4R, 4G, and 4B as the cooling target is out of the target temperature range. In the present embodiment, the controller 90 changes all of the output of the first blower 60, the output of the heater 22, and the cooling degree by the heat exchanger 30 when the temperature of the cooling target is out of the target temperature range. Further, the controller 90 increases at least one of the output of the first blower 60, the output of the heater 22, and the cooling degree by the heat exchanger 30 when the temperature of the cooling target is higher than the target temperature range, and further, decreases at least one of the output of the first blower 60, the output of the heater 22, and the cooling degree by the heat exchanger 30 when the temperature of the cooling target is lower than the target temperature range.

In the present embodiment, the controller 90 repeatedly executes the control in the step St12 through the step St16 described above every predetermined time during the period when the projector 1 is in operation. The predetermined time is, for example, several seconds.

According to the present embodiment, it is possible for the cooler 10 to cool the cooling target by drawing heat from the cooling target using the evaporation of the refrigerant W as an endothermic reaction after transmitting the refrigerant W generated in the refrigerant generator 20 to the cooling target with the refrigerant sender 50. The cooling action by the evaporation of the refrigerant W can actively draw heat from the cooling target, and is therefore superior in cooling performance compared to when cooling the cooling target by mere heat transmission to the refrigerant as in the case of air cooling or liquid cooling. Thus, when obtaining the same cooling performance as those of air cooling and liquid cooling, it is easy to reduce the entire size of the cooler 10 compared to air cooling and liquid cooling.

Further, in the case of the cooling action by the evaporation of the refrigerant W, the cooling performance can be improved by increasing the surface area where the refrigerant W to be evaporated has contact with the cooling target. Therefore, even when raising the cooling performance obtained using the cooler 10, it is possible to suppress an increase in the sound noise. As described above, according to the present embodiment, it is possible to obtain the projector 1 equipped with the cooler 10 excellent in cooling performance, small in size, and excellent in quietness.

Further, according to the present embodiment, since the refrigerant W can be generated in the refrigerant generator 20, time and effort for refilling the refrigerant W are not required for the user, and thus, the convenience of the user can be enhanced. Further, since it is possible for the refrigerant generator 20 to control generation of the refrigerant W so as to generate necessary amount of refrigerant W when needed, it is not necessary to retain the refrigerant W in a reservoir tank or the like, and thus, it is possible to reduce the weight of the projector 1.

Further, according to the present embodiment, it is possible to absorb the steam included in the air AR1 fed from the first blower 60 by the moisture absorption/desorption member 40, and it is possible to release the moisture absorbed by the moisture absorption/desorption member 40 in the air AR2 fed by the second blower 23 as steam. Further, it is possible to generate the refrigerant W by condensing the moisture released as steam in the air AR2 using the heat exchanger 30. Thus, according to the present embodiment, it is possible to generate the refrigerant W from the air in the projector 1.

Further, according to the present embodiment, the heat exchanger 30 is cooled by the air AR1 which has been discharged from the first blower 60, and then passed through the moisture absorption/desorption member 40. Therefore, it is unnecessary to separately dispose a cooling section for cooling the heat exchanger 30, and thus, it is possible to suppress an increase in the number of components of the projector 1. Further, it is possible to prevent the sound noise generated from the projector 1 from increasing compared to when additionally provide a blower as the cooling section for cooling the heat exchanger 30.

Further, according to the present embodiment, the first blower 60 is the cooling blower for feeding the air AR1 to the light modulation units 4R, 4G, and 4B as the cooling target. Therefore, it is easy to evaporate the refrigerant W transmitted to the light modulation units 4R, 4G, and 4B with the air AR1, and it is possible to further cool the light modulation units 4R, 4G, and 4B. Further, since it is unnecessary to separately provide the cooling blower for cooling the cooling target in addition to the first blower 60, it is possible to prevent the number of components of the projector 1 from increasing, and it is possible to prevent the sound noise from increasing.

Further, as described above, in the present embodiment, the evaporation of the refrigerant W fed to the cooling target is promoted using the first blower 60 as the intake fan for taking in the external air inside the projector 1. Even when lowering the output of the first blower 60, it is possible to obtain the cooling performance equivalent to when the cooler 10 is not provided. Therefore, it is possible to lower the output of the first blower 60 as the intake fan to thereby reduce the sound noise generated from the first blower 60, and thus, it is possible to further enhance the quietness of the projector 1.

Further, for example, in the refrigerant generator 20, when the humidity of the air AR2 fed from the second blower 23 to the heat exchanger 30 is relatively low, the refrigerant W is difficult to be generated in some cases even when the heat exchanger 30 is cooled. The humidity of the air AR2 to be fed to the heat exchanger 30 drops in some cases when, for example, the air outside the projector 1 is mixed with the air AR2.

In this regard, according to the present embodiment, the refrigerant generator 20 has the circulation channel 27 through which the air AR2 discharged from the second blower 23 circulates. Therefore, it is possible to prevent the air located outside the projector 1 from entering the circulation channel 27 by substantially sealing the circulation channel 27, and it is easy to keep the humidity of the air AR2 fed to the heat exchanger 30 in a relatively high state. Therefore, by cooling the heat exchanger 30, it is possible to generate the refrigerant W in good condition.

Further, according to the present embodiment, the heater 22 has the heating main body part 22a for heating the air which has not passed the part of the moisture absorption/desorption member 40 located in the second area F2, and the second blower 23. Therefore, it is possible for the heater 22 to heat the part of the moisture absorption/desorption member 40 located in the second area F2 by feeding the air AR2 to the moisture absorption/desorption member 40 using the second blower 23. Thus, it is possible to heat the moisture absorption/desorption member 40 using the heater 22 even when disposing the heating main body part 22a at a position distant from the moisture absorption/desorption member 40. Therefore, the degree of freedom of the configuration of the heater 22 can be enhanced.

Further, for example, when the temperature of the cooling target becomes out of the target temperature range, there is a possibility that a problem occurs in the cooling target. For example, when the cooling target comprises the light modulators 4RP, 4GP, and 4BP as in the present embodiment, when the temperature of the light modulators 4RP, 4GP, and 4BP is higher than the target temperature range, there is a possibility that the light modulators 4RP, 4GP, and 4BP are damaged by the heat. Further, when the temperature of the light modulators 4RP, 4GP, and 4BP is lower than the target temperature range, there is a possibility that the response characteristics of the liquid crystal panels of the light modulators 4RP, 4GP, and 4BP deteriorate to cause a blur, a flicker, and so on in the color image (picture) emitted from the projector 1. Therefore, there is a possibility that the reliability of the projector 1 degrades.

In contrast, according to the present embodiment, the controller 90 controls the refrigerant generator 20 based on the temperature of the cooling target. Therefore, it is possible to control the amount of the refrigerant W to be generated in the refrigerant generator 20 based on the temperature of the cooling target, and it is possible to control the temperature of the cooling target to be cooled by the refrigerant W. Thus, it is easy to keep the temperature of the cooling target within the target temperature range. Therefore, it is possible to prevent the problem from occurring in the cooling target, and it is possible to prevent the reliability of the projector 1 from degrading.

Further, according to the present embodiment, the controller 90 controls at least one of the output of the first blower 60, the output of the heater 22, and the cooling degree by the heat exchanger 30 based on the temperature of the cooling target. Therefore, it is possible for the controller 90 to control at least one of an amount of the steam absorbed by the moisture absorption/desorption member 40, an amount of the steam released to the air AR2 from the moisture absorption/desorption member 40, and an amount of the steam condensed in the heat exchanger 30. Thus, by controlling the output or the like of each section of the refrigerant generator 20, it is possible to easily control the amount of the refrigerant W generated in the refrigerant generator 20. Therefore, it is easier to keep the temperature of the cooling target within the target temperature range, and it is possible to more strictly prevent the reliability of the projector 1 from degrading.

Further, according to the present embodiment, the controller 90 changes at least one of the output of the first blower 60, the output of the heater 22, and the cooling degree by the heat exchanger 30 when the temperature of the cooling target is out of the target temperature range. Therefore, when the temperature of the cooling target becomes out of the target temperature range, it is possible to control the amount of generation of the refrigerant W so that the temperature of the cooling target becomes within the target temperature range. Therefore, it is easier to keep the temperature of the cooling target within the target temperature range, and it is possible to more strictly prevent the reliability of the projector 1 from degrading.

More particularly, in the present embodiment, the controller 90 increases at least one of the output of the first blower 60, the output of the heater 22, and the cooling degree by the heat exchanger 30 when the temperature of the cooling target is higher than the target temperature range. Therefore, when the temperature of the cooling target becomes higher than the target temperature range, it is possible to increase the amount of generation of the refrigerant W, and it is possible to increase the cooling degree by the cooling target. Thus, it is possible to lower the temperature of the cooling target, and thus, it is possible to set the temperature of the cooling target within the target temperature range.

Further, in the present embodiment, the controller 90 decreases at least one of the output of the first blower 60, the output of the heater 22, and the cooling degree by the heat exchanger 30 when the temperature of the cooling target is lower than the target temperature range. Therefore, when the temperature of the cooling target becomes lower than the target temperature range, it is possible to decrease the amount of generation of the refrigerant W, and it is possible to decrease the cooling degree by the cooling target. Thus, it is possible to raise the temperature of the cooling target, and thus, it is possible to set the temperature of the cooling target within the target temperature range.

Further, according to the present embodiment, the controller 90 controls all of the output of the first blower 60, the output of the heater 22, and the cooling degree by the heat exchanger 30 based on the temperature of the cooling target. Therefore, the amount of the refrigerant W generated in the refrigerant generator 20 can more easily be controlled. Thus, it is possible to more easily control the temperature of the cooling target, and it is easy to more preferably keep the temperature of the cooling target within the target temperature range. Therefore, it is possible to more strictly prevent the reliability of the projector 1 from degrading.

Further, according to the present embodiment, the cooling target corresponds to the light modulators 4RP, 4GP, and 4BP. Therefore, by controlling the refrigerant generator 20 based on the temperature of the light modulators 4RP, 4GP, and 4BP, it is easy to keep the temperature of the light modulators 4RP, 4GP, and 4BP within the target temperature range. Thus, it is possible to prevent the blur and the flicker from occurring in the color image (picture) emitted from the projector 1.

Further, according to the present embodiment, the refrigerant generator 20 has the motor 24 for rotating the moisture absorption/desorption member 40. Therefore, it is possible to stably rotate the moisture absorption/desorption member 40 at a constant speed. Thus, it is possible to make the part of the moisture absorption/desorption member 40 located in the first area F1 preferably absorb the steam from the air AR1, and at the same time, it is possible to make the part of the moisture absorption/desorption member 40 located in the second area F2 preferably release the moisture to the air AR2. Therefore, it is possible to efficiently generate the refrigerant W.

Further, according to the present embodiment, the refrigerant sender 50 transmits the refrigerant W due to a capillary action. Therefore, there is no need to separately prepare a power source such as a pump for transmitting the refrigerant W. Thus, it is possible to prevent the number of components of the projector 1 from increasing, and thus, it is easier to reduce the size and the weight of the projector 1.

Further, according to the present embodiment, the refrigerant sender 50 has the coupling part 54 made of the porous material for coupling the refrigerant generator 20 and the cooling target to each other. Therefore, it is possible to make the coupling part 54 absorb the refrigerant W to transmit the refrigerant W with the capillary action.

Further, according to the present embodiment, the refrigerant sender 50 has the second trapping part 52 disposed inside the second lid part 33. The second trapping part 52 is coupled to the coupling part 54. Therefore, it is possible to absorb the refrigerant W retained inside the second lid part 33 using the second trapping part 52 to transmit the refrigerant W to the coupling part 54 using the capillary action. Thus, it is easy to transmit the refrigerant W thus generated to the cooling target without a waste.

Further, according to the present embodiment, the refrigerant sender 50 has the first trapping part 51 disposed inside the first lid part 32, and a third trapping part 53 for coupling the first trapping part 51 and the second trapping part 52 to each other. Thus, it is possible to absorb the refrigerant W retained inside the first lid part 32 using the first trapping part 51 to transmit the refrigerant W to the second trapping part 52 via the third trapping part 53 using the capillary action. Therefore, it is possible to transmit the refrigerant W retained inside the first lid part 32 from the second trapping part 52 to the coupling part 54 to transmit the refrigerant W to the cooling target. Therefore, it is easy to transmit the refrigerant W thus generated to the cooling target with a fewer waste.

Further, according to the present embodiment, the third trapping part 53 passes through the pipe part 31a. Therefore, it is possible to absorb the refrigerant W retained inside the pipe part 31a using the third trapping part 53 to transmit the refrigerant W to the cooling target via the second trapping part 52 and the coupling part 54. Therefore, it is easy to transmit the refrigerant W thus generated to the cooling target with a fewer waste.

Further, according to the present embodiment, the width of the coupling part 54 is larger than, for example, the width of the first trapping part 51, the width of the second trapping part 52, and the width of the third trapping part 53. Therefore, it is easy to make the width of the coupling part 54 relatively large, and it is possible to increase the amount of the refrigerant W which can be transmitted by the coupling part 54. Therefore, it is easy to transmit the refrigerant W to the cooling target using the refrigerant sender 50, and it is easier to cool the cooling target.

Further, on the other hand, it is easy to make the width of the first trapping part 51, the width of the second trapping part 52, and the width of the third trapping part 53 relatively small. Therefore, it is possible to reduce the amount of the refrigerant W to be retained by the first trapping part 51, the second trapping part 52, and the third trapping part 53. Thus, it is possible to reduce the amount of the refrigerant W remaining inside the heat exchanger 30 while being retained in the first trapping part 51, the second trapping part 52, and the third trapping part 53, and it is easy to transmit the refrigerant W thus generated to the cooling target with a fewer waste.

Further, according to the present embodiment, there are provided the refrigerant holders 71 which are respectively provided to the light modulation units 4R, 4G, and 4B as the cooling target, and retain the refrigerant W. Therefore, the refrigerant W transmitted to the light modulation units 4R, 4G, and 4B can be retained in the light modulation units 4R, 4G, and 4B by the refrigerant holders 71 until the refrigerant W evaporates. Thus, it is easy to use the refrigerant W thus generated without a waste, and it is possible to further improve the cooling performance of the cooler 10.

Further, according to the present embodiment, the refrigerant holders 71 are respectively attached to the surfaces of the light modulation units 4R, 4G, and 4B as the cooling target, and are made of the porous material. Further, at least a part of each of the refrigerant holders 71 is exposed when viewed from the refrigerant holder 71 side in the stacking direction. Therefore, it is easy to evaporate the refrigerant W from the exposed part of the refrigerant holder 71, and it is possible to further improve the cooling performance of the cooler 10. Further, since the refrigerant holders 71 are each made of the porous material, it is easy to make the refrigerant W evenly take over the surface of the cooling target on which the refrigerant holder 71 is disposed due to the capillary action, and it is easier to cool the cooling target.

Further, for example, when fixing the refrigerant holders 71 to the holding frames 80 with an adhesive, the adhesive is absorbed by the refrigerant holders 71 to block the holes of the refrigerant holders 71 made of the porous material in some cases. Therefore, it becomes difficult for the refrigerant W to be absorbed by the refrigerant holders 71, and it becomes difficult for the refrigerant holders 71 to retain the refrigerant W in some cases.

In contrast, according to the present embodiment, there are provided the fixation members 72 each for sandwiching the refrigerant holder 71 with the holding frame 80 to fix the refrigerant holder 71. Therefore, it is possible to fix the refrigerant holders 71 to the respective holding frames 80 without using the adhesive. Thus, it is possible to prevent the refrigerant holders 71 from becoming difficult to retain the refrigerant W. Further, in the present embodiment, the fixation members 72 are made of metal. Therefore, the fixation members 72 are relatively high in thermal conductivity, and are easy to cool. Therefore, it is easy for the temperature of the fixation members 72 to drop due to the air AR1 from the first blower 60 and the evaporation of the refrigerant W, and thus, it is easier to cool the cooling target having contact with the fixation members 72.

Further, according to the present embodiment, the refrigerant holder 71 is disposed on the surface on the light incident side of the light modulator 4GP in the holding frame 80. Therefore, it is possible to prevent the steam as the refrigerant W evaporated from the refrigerant holder 71 from affecting the light emitted from the light modulator 4GP to the light combining optical system 5. Thus, it is possible to prevent the noise from occurring in the image projected from the projector 1.

Further according to the present embodiment, the refrigerant holders 71 are provided to the respective light modulation units 4R, 4G, and 4B thus disposed as the plurality of units, and there are provided the junction parts 73a, 73b for joining the refrigerant holders 71 to each other. Therefore, by coupling the refrigerant sender 50 to one of the refrigerant holders 71, it is possible to transmit the refrigerant W also to the rest of the refrigerant holders 71. Thus, it is possible to simplify the arrangement of the refrigerant sender 50 inside the projector 1.

Further, according to the present embodiment, the junction parts 73a, 73b are provided with the covering parts 74 for respectively covering the junction parts 73a, 73b. Therefore, it is possible to prevent the refrigerant W moving along the junction parts 73a, 73b from evaporating in the junction parts 73a, 73b. Thus, it is possible to prevent the refrigerant W from evaporating without making a contribution to cooling of the light modulation units 4R, 4G, and 4B as the cooling target, and thus, it is possible to prevent the refrigerant W thus generated from being wasted.

It should be noted that in the present embodiment, the coupling part 54 can be coated similarly to the junction parts 73a, 73b. According to this configuration, it is possible to prevent the refrigerant W from evaporating during the transmission to the cooling target. Therefore, it is possible to efficiently transmit the refrigerant W to the cooling target, and at the same time, it is possible to more strictly prevent the refrigerant W thus generated from being wasted. It is also possible for the coupling part 54 and the junction parts 73a, 73b to be coated in the periphery with, for example, a tube. Further, it is also possible for the coupling part 54 and the junction parts 73a, 73b to be provided with a coating treatment for preventing the evaporation on the respective surfaces.

Second Embodiment

The present embodiment is different from the first embodiment in the control procedure by the controller 90, and in the point that a humidity sensor 192 represented by the dashed-two dotted lines in FIG. 2 is provided. The rest of the configuration in the present embodiment is substantially the same as the rest of the configuration in the first embodiment. It should be noted that the constituents substantially the same as those of the embodiment described above are arbitrarily denoted by the same reference symbols, and the description thereof will be omitted in some cases.

The humidity sensor 192 is provided to, for example, the housing of the projector 1. The humidity sensor 192 is capable of measuring the ambient humidity of the projector 1, namely the humidity in the external environment in which the projector 1 is installed. The measuring result of the humidity sensor 192 is transmitted to the controller 90.

In the present embodiment, the controller 90 controls the refrigerant generator 20 based on the ambient humidity of the projector 1 obtained from the humidity sensor 192. In the present embodiment, the controller 90 controls at least one of the output of the first blower 60, the output of the heater 22, and the cooling degree by the heat exchanger 30 based on the ambient humidity of the projector 1. In the present embodiment, the controller 90 controls all of the output of the first blower 60, the output of the heater 22, and the cooling degree by the heat exchanger 30 based on the ambient humidity of the projector 1. The method of controlling the output of the first blower 60, the output of the heater 22, and the cooling degree by the heat exchanger 30 is substantially the same as in the first embodiment.

Figure 11:
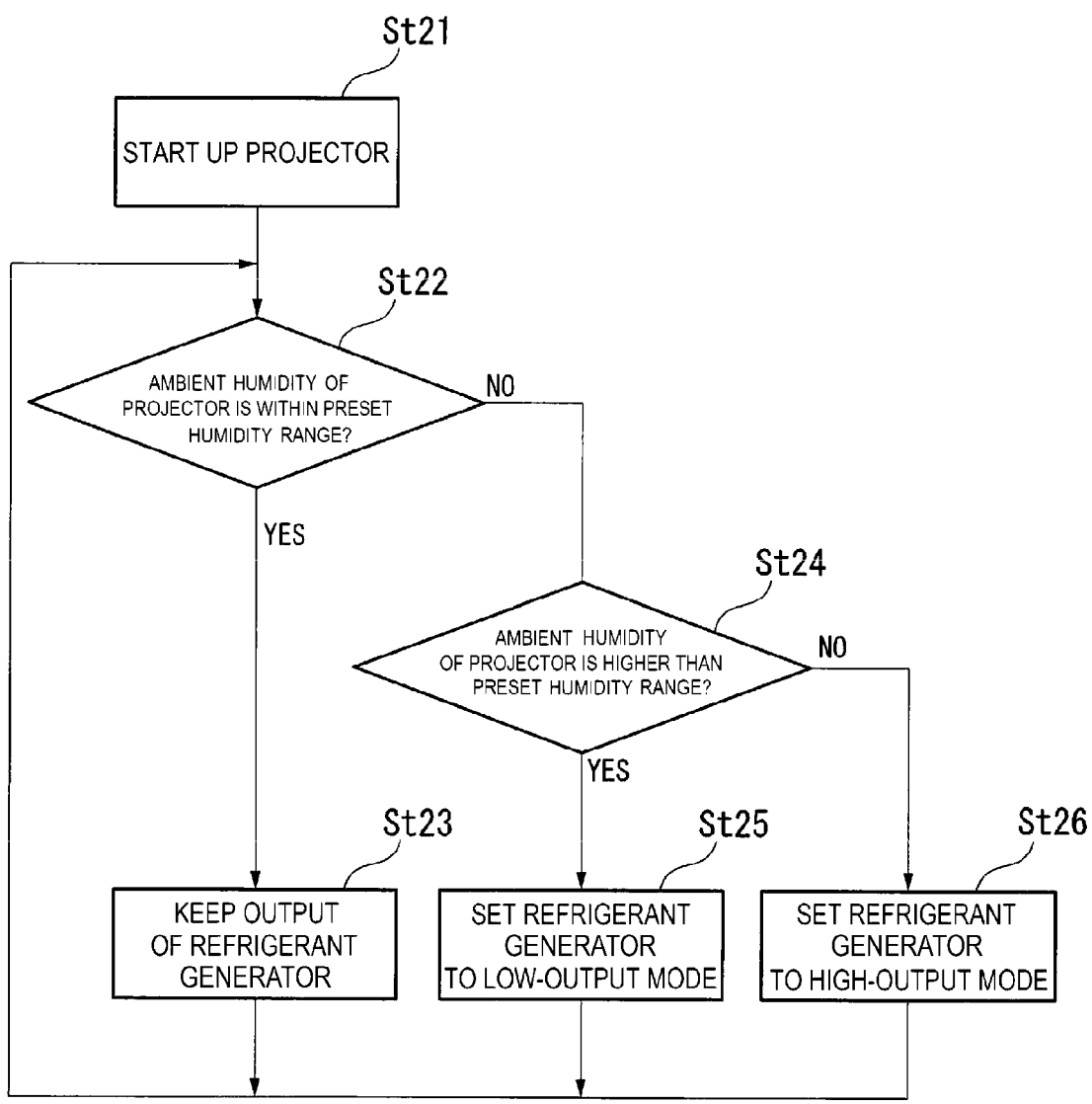
FIG. 11 is a flowchart showing an example of a procedure of controlling a controller in a second embodiment.

FIG. 11 is a flowchart showing an example of the procedure of controlling the controller 90 in the present embodiment.

As shown in FIG. 11, the controller 90 determines (step St22) whether or not the ambient humidity of the projector 1 is within a preset humidity range after the projector 1 has started up (step St21). In the present embodiment, the controller 90 determines whether or not the ambient humidity of the projector 1 is within the preset humidity range based on the measuring result by the humidity sensor 192.

The preset humidity range is, for example, a humidity range set in advance. The preset humidity range is decided based on, for example, average humidity in the place where the projector 1 is used. The preset humidity range is, for example, no lower than 40%, and no higher than 60%. In the present embodiment, the output of the refrigerant generator 20 is set so that the refrigerant W can efficiently be generated in the preset humidity range. It should be noted that the preset humidity range can arbitrarily be changed in accordance with a change of the seasons and a change in the external environment in which the projector 1 is installed.

When the ambient humidity of the projector 1 is within the preset humidity range (YES in the step St22), the controller 90 keeps (step St23) the output of the refrigerant generator 20 in the current output. In other words, the controller 90 keeps the output of the first blower 60, the output of the heater 22, and the cooling degree by the heat exchanger 30 in the current state without making changes.

In contrast, when the ambient humidity of the projector 1 is out of the preset humidity range (NO in the step St22), the controller 90 determines (step St24) whether or not the ambient humidity of the projector 1 is higher than the preset humidity range. In the present embodiment, the controller 90 determines whether or not the ambient humidity of the projector 1 is higher than the preset humidity range based on the measuring result by the humidity sensor 192.

When the ambient humidity of the projector 1 is higher than the preset humidity range (YES in the step St24), the controller 90 sets (step St25) the refrigerant generator 20 to a low-output mode. The low-output mode is a mode in which the output of the refrigerant generator 20 becomes lower than the output of the refrigerant generator 20 when the humidity of the projector 1 is within the preset humidity range. In other words, when the ambient humidity of the projector 1 is higher than the preset humidity range, the controller 90 makes the output of the first blower 60, the output of the heater 22, and the cooling degree by the heat exchanger 30 lower than the levels set when the ambient humidity of the projector 1 is within the preset humidity range.

The output of the refrigerant generator 20 in the low-output mode can be, for example, a constant value, or can also be changed in accordance with the level of the ambient humidity of the projector 1. When the output of the refrigerant generator 20 in the low-output mode changes in accordance with the level of the ambient humidity of the projector 1, the controller 90 sets the output of the refrigerant generator 20 so that the higher the ambient humidity of the projector 1 is, the lower the output of the refrigerant generator 20 is. In this case, the change in output of the refrigerant generator can change linearly with respect to the ambient humidity of the projector 1, or can also change in a stepwise fashion.

In contrast, when the ambient humidity of the projector 1 is lower than the preset humidity range (NO in the step St24), the controller 90 sets (step St26) the refrigerant generator 20 to a high-output mode. The high-output mode is a mode in which the output of the refrigerant generator 20 becomes higher than the output of the refrigerant generator 20 when the humidity of the projector 1 is within the preset humidity range. In other words, when the ambient humidity of the projector 1 is lower than the preset humidity range, the controller 90 makes the output of the first blower 60, the output of the heater 22, and the cooling degree by the heat exchanger 30 higher than the levels set when the ambient humidity of the projector 1 is within the preset humidity range.

The output of the refrigerant generator 20 in the high-output mode can be, for example, a constant value, or can also be changed in accordance with the level of the ambient humidity of the projector 1. When the output of the refrigerant generator 20 in the high-output mode changes in accordance with the level of the ambient humidity of the projector 1, the controller 90 sets the output of the refrigerant generator 20 so that the lower the ambient humidity of the projector 1 is, the higher the output of the refrigerant generator 20 is. In this case, the change in output of the refrigerant generator can change linearly with respect to the ambient humidity of the projector 1, or can also change in a stepwise fashion.

In such a manner as described above, the controller 90 changes at least one of the output of the first blower 60, the output of the heater 22, and the cooling degree by the heat exchanger 30 when the ambient humidity of the projector 1 is out of the preset humidity range. In the present embodiment, the controller 90 changes all of the output of the first blower 60, the output of the heater 22, and the cooling degree by the heat exchanger 30 when the ambient humidity of the projector 1 is out of the preset humidity range. Further, the controller 90 decreases at least one of the output of the first blower 60, the output of the heater 22, and the cooling degree by the heat exchanger 30 when the ambient humidity of the projector 1 is higher than the preset humidity range, and further, increases at least one of the output of the first blower 60, the output of the heater 22, and the cooling degree by the heat exchanger 30 when the ambient humidity of the projector 1 is lower than the preset humidity range.

In the present embodiment, the controller 90 repeatedly executes the control in the step St22 through the step St26 described above every predetermined time during the period when the projector 1 is in operation. The predetermined time is, for example, several seconds. The intervals (the predetermined time) of executing the control in the present embodiment can be the same as, or can also be different from, the intervals (the predetermined time) of executing the control in the first embodiment.

For example, when the ambient humidity of the projector 1 is higher than the preset humidity range, the amount of the steam included in the air AR1 taken in from the outside of the projector 1 by the first blower 60 becomes larger than when the ambient humidity of the projector 1 is within the preset humidity range. Therefore, the amount of the steam absorbed by the moisture absorption/desorption member 40 from the air AR1 increases, and as a result, the amount of generation of the refrigerant W in the refrigerant generator 20 increases. Therefore, there is a possibility that a larger amount of the refrigerant W than necessary is transmitted to the cooling target, and the temperature of the cooling target becomes lower than the target temperature range. Further, there is also a possibility that the refrigerant W is excessively generated, and the refrigerant W is leaked outside the projector 1.

Further, for example, when the ambient humidity of the projector 1 is lower than the preset humidity range, the amount of the steam included in the air AR1 taken in from the outside of the projector 1 by the first blower 60 becomes smaller. Therefore, the amount of the steam absorbed by the moisture absorption/desorption member 40 from the air AR1 decreases, and as a result, the amount of generation of the refrigerant W in the refrigerant generator 20 decreases. Therefore, there is a possibility that a necessary amount of the refrigerant W is not transmitted to the cooling target, and the temperature of the cooling target becomes higher than the target temperature range.

In contrast, according to the present embodiment, the controller 90 controls the refrigerant generator 20 based on the ambient humidity of the projector 1. Therefore, it is possible to control the amount of the refrigerant W to be generated in the refrigerant generator 20 based on the ambient humidity of the projector 1. Thus, it is possible to generate a preferable amount of refrigerant W even when the ambient humidity of the projector 1 is out of the preset humidity range, and it is easy to keep the temperature of the cooling target within the target temperature range. Therefore, it is possible to prevent the problem from occurring in the cooling target, and it is possible to prevent the reliability of the projector 1 from degrading. Further, it is possible to prevent the refrigerant W from being leaked outside the projector 1.

Further, according to the present embodiment, the controller 90 controls at least one of the output of the first blower 60, the output of the heater 22, and the cooling degree by the heat exchanger 30 based on the ambient humidity of the projector 1. Therefore, similarly to the first embodiment, by controlling the output or the like of each section of the refrigerant generator 20, it is possible to easily control the amount of the refrigerant W generated in the refrigerant generator 20. Therefore, it is easier to keep the temperature of the cooling target within the target temperature range, and it is possible to more strictly prevent the reliability of the projector 1 from degrading.

Further, according to the present embodiment, the controller 90 changes at least one of the output of the first blower 60, the output of the heater 22, and the cooling degree by the heat exchanger 30 when the ambient humidity of the projector 1 is out of the preset humidity range. Therefore, when the ambient humidity of the projector 1 is out of the preset humidity range, it is possible to control the amount of generation of the refrigerant W so that the temperature of the cooling target becomes within the target temperature range. Therefore, it is easier to keep the temperature of the cooling target within the target temperature range, and it is possible to more strictly prevent the reliability of the projector 1 from degrading.

More particularly, in the present embodiment, the controller 90 decreases at least one of the output of the first blower 60, the output of the heater 22, and the cooling degree by the heat exchanger 30 when the ambient humidity of the projector 1 is higher than the preset humidity range. Therefore, when the ambient humidity of the projector 1 is higher than the preset humidity range, it is possible to reduce the amount of generation of the refrigerant W, and thus, it is possible to prevent the cooling degree of the cooling target from becoming higher than necessary. Thus, it is possible to prevent the temperature of the cooling target from becoming lower than the target temperature range, and thus, it is possible to set the temperature of the cooling target within the target temperature range.

Further, according to the present embodiment, the controller 90 increases at least one of the output of the first blower 60, the output of the heater 22, and the cooling degree by the heat exchanger 30 when the ambient humidity of the projector 1 is lower than the preset humidity range. Therefore, when the ambient humidity of the projector 1 is lower than the preset humidity range, it is possible to increase the amount of generation of the refrigerant W, and thus, it is possible to prevent the cooling degree of the cooling target from becoming insufficient. Thus, it is possible to prevent the temperature of the cooling target from becoming higher than the target temperature range, and thus, it is possible to set the temperature of the cooling target within the target temperature range.

Further, according to the present embodiment, the controller 90 controls all of the output of the first blower 60, the output of the heater 22, and the cooling degree by the heat exchanger 30 based on the ambient humidity of the projector 1. Therefore, the amount of the refrigerant W generated in the refrigerant generator 20 can more easily be controlled. Thus, it is easier to keep the temperature of the cooling target within the target temperature range. Therefore, it is possible to more strictly prevent the reliability of the projector 1 from degrading.

It should be noted that in the present embodiment, it is also possible to adopt the configurations and methods described below.

It is sufficient for the controller to control the refrigerant generator based on at least one of the temperature of the cooling target and the ambient humidity of the projector. In other words, it is possible for the controller to control the refrigerant generator based on both of the temperature of the cooling target and the ambient humidity of the projector. In this case, the amount of the refrigerant W generated in the refrigerant generator can more preferably be controlled. Therefore, it is possible to more preferably keep the temperature of the cooling target within the target temperature range, and it is possible to more strictly prevent the reliability of the projector from degrading.

When controlling the refrigerant generator based on both of the temperature of the cooling target and the ambient humidity of the projector, it is possible for the controller to give priority to the control of the refrigerant generator based on the temperature of the cooling target over the control of the refrigerant generator based on the ambient humidity of the projector. In this case, when the change in the output of the refrigerant generator based on the temperature of the cooling target and the change in the output of the refrigerant generator based on the ambient humidity of the projector are opposite in direction to each other, the controller executes only the change in the output of the refrigerant generator based on the temperature of the cooling target, but does not execute the change in the output of the refrigerant generator based on the ambient humidity of the projector. Thus, it is possible to make it easier to more preferably keep the temperature of the cooling target within the target temperature range.

It is sufficient for the controller to control at least one of the output of the first blower, the output of the heater, and the cooling degree by the heat exchanger when controlling the refrigerant generator. In other words, it is possible for the controller to control any one or two of the output of the first blower, the output of the heater, and the cooling degree by the heat exchanger when controlling the refrigerant generator. It is possible for the heat exchanger to be cooled by the air fed from a blower different from the first blower. In this case, it is possible to control the output of the first blower and the cooling degree by the heat exchanger separately from each other.

The heater is not limited to the embodiments described above. The heater can have a configuration of having contact with the moisture absorption/desorption member to heat the moisture absorption/desorption member. In this case, the heater is not required to heat the air which has not passed through the moisture absorption/desorption member.

In the embodiments described above, it is assumed that the cooling blower is the first blower 60 provided to the refrigerant generator 20, but this is not a limitation. The refrigerant blower can also be separately provided in addition to the blowers provided to the refrigerant generator 20.

The configuration of the cooler is not limited to the configuration in each of the embodiments described above. The cooler is not particularly limited providing the cooler includes the refrigerant generator and the refrigerant sender. The refrigerant generator can have a configuration of, for example, condensing the steam on the heat absorption surface of a Peltier element to thereby generate the refrigerant. In this case, it is possible for the controller to control the power applied to the Peltier element to thereby control the refrigerant generator.

Further, in each of the embodiments described above, it is assumed that the cooling target is the light modulation units, but this is not a limitation. The cooling target can include at least one of the light modulator, the light modulation units, the light source device, a wavelength conversion element for converting the wavelength of the light emitted from the light source device, a diffusion element for diffusing the light emitted from the light source device, and a polarization conversion element for converting the polarization direction of the light emitted from the light source device. According to this configuration, it is possible to cool each of the constituents of the projector in a similar manner as described above.

Further, although in the embodiments described above, there is described the example when the present disclosure is applied to the transmissive projector, the present disclosure can also be applied to reflective projectors. Here, "transmissive" denotes that the light modulator including the liquid crystal panel and so on is a type of transmitting the light. Further, "reflective" denotes that the light modulator is a type of reflecting the light. It should be noted that the light modulator is not limited to the liquid crystal panel or the like, but can also be a light modulator using, for example, micro-mirrors.

Further, although in the embodiments described above, there is cited the example of the projector using the three light modulators, the present disclosure can also be applied to a projector using one light modulator alone or a projector using four or more light modulators.

Further, the configurations or the methods described in the present specification can arbitrarily be combined with each other within a range in which the configurations or the methods do not conflict with each other.

What is claimed is:

1. A projector having a cooling target, comprising:
a light source configured to emit light;
a light modulator configured to modulate the light emitted from the light source in accordance with an image signal;
a projection optical device configured to project the light modulated by the light modulator;
a cooler configured to cool the cooling target based on transformation of a refrigerant into a gas; and
a controller configured to control the cooler, wherein
the cooler includes
a refrigerant generator configured to generate the refrigerant, and
a refrigerant sender configured to transmit the generated refrigerant toward the cooling target, and
the controller controls the refrigerant generator based on at least one of temperature of the cooling target and ambient humidity of the projector.

2. The projector according to claim 1, wherein
the refrigerant generator includes
a rotating moisture absorption/desorption member,
a first blower configured to deliver air to a first part of the moisture absorption/desorption member located in a first area,
a heat exchanger coupled to the refrigerant sender,
a heater configured to heat a second part of the moisture absorption/desorption member located in a second area different from the first area, and
a second blower configured to deliver ambient air of the second part heated by the heater in the moisture absorption/desorption member to the heat exchanger,
the heat exchanger is cooled to thereby generate the refrigerant from the air flowed into the heat exchanger, and
the controller controls at least one of an output of the first blower, an output of the heater, and a cooling degree by the heat exchanger based on at least one of the temperature of the cooling target and the ambient humidity of the projector.

3. The projector according to claim 2, wherein
the controller changes at least one of the output of the first blower, the output of the heater, and the cooling degree by the heat exchanger when the temperature of the cooling target is out of a target temperature range.

4. The projector according to claim 3, wherein
the controller increases at least one of the output of the first blower, the output of the heater, and the cooling degree by the heat exchanger when the temperature of the cooling target is higher than the target temperature range.

5. The projector according to claim 3, wherein
the controller decreases at least one of the output of the first blower, the output of the heater, and the cooling degree by the heat exchanger when the temperature of the cooling target is lower than the target temperature range.

6. The projector according to claim 2, wherein
the controller changes all of the output of the first blower, the output of the heater, and the cooling degree by the heat exchanger based on the temperature of the cooling target.

7. The projector according to claim 2, wherein
the controller changes at least one of the output of the first blower, the output of the heater, and the cooling degree by the heat exchanger when the ambient humidity of the projector is out of a preset humidity range.

8. The projector according to claim 7, wherein
when the ambient humidity of the projector is higher than the preset humidity range, the controller makes at least one of the output of the first blower, the output of the heater, and the cooling degree by the heat exchanger lower than a level set when the ambient humidity of the projector is within the preset humidity range.

9. The projector according to claim 7, wherein
when the ambient humidity of the projector is lower than the preset humidity range, the controller makes at least one of the output of the first blower, the output of the heater, and the cooling degree by the heat exchanger higher than a level set when the ambient humidity of the projector is within the preset humidity range.

10. The projector according to claim 2, wherein
the controller controls all of the output of the first blower, the output of the heater, and the cooling degree by the heat exchanger based on the ambient humidity of the projector.

11. The projector according to claim 1, wherein
the controller controls the refrigerant generator based on both of the temperature of the cooling target and the ambient humidity of the projector.

12. The projector according to claim 11, wherein
the controller gives priority to a control of the refrigerant generator based on the temperature of the cooling target over a control of the refrigerant generator based on the ambient humidity of the projector.

13. The projector according to claim 1, wherein the cooling target is the light modulator.

\* \* \* \* \*